Figure 1:
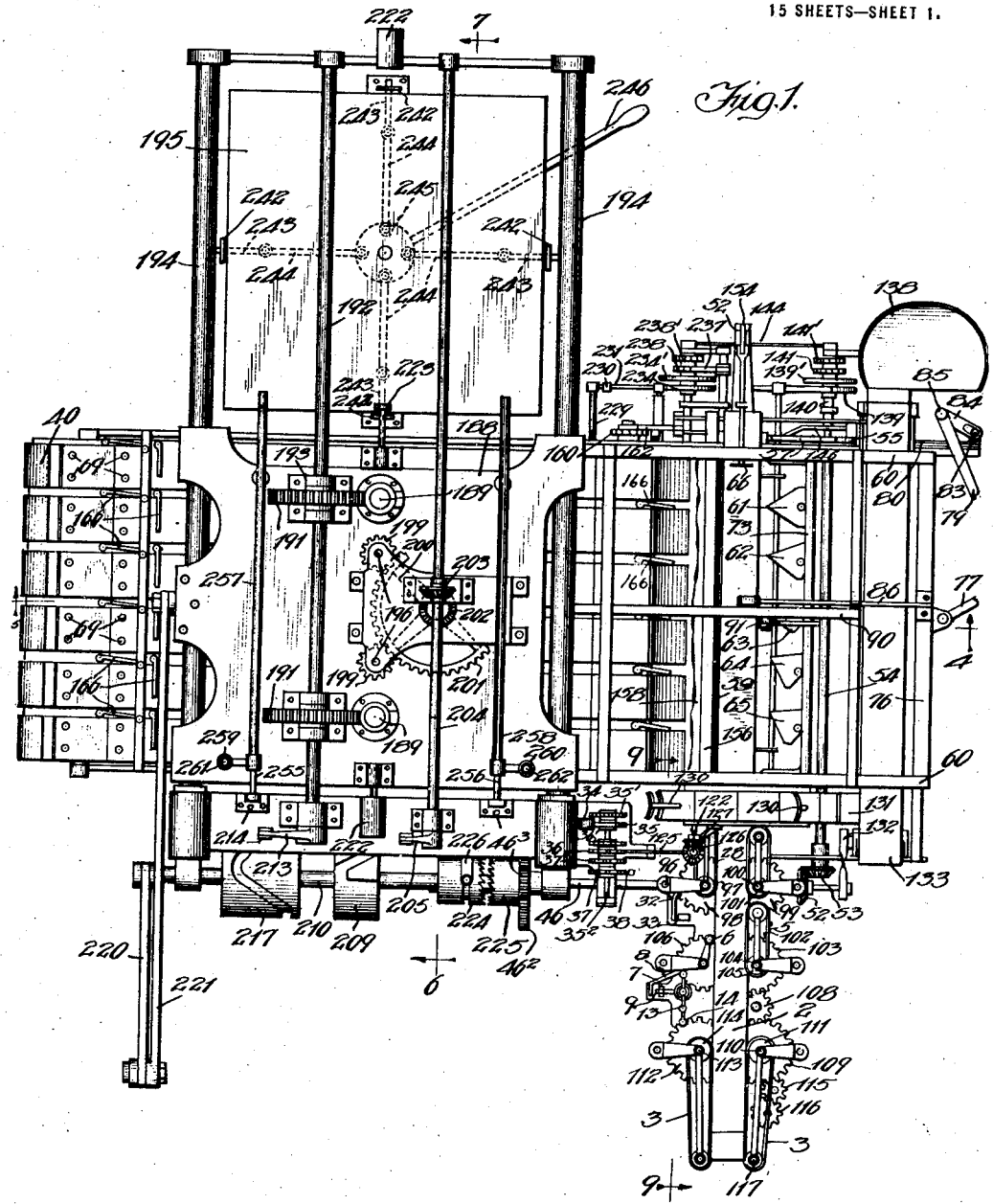

J. FREUD.
CONVEYING MECHANISM.
APPLICATION FILED DEC. 26, 1917.

1,330,524.

Patented Feb. 10, 1920.
15 SHEETS—SHEET 5.

Inventor:
Joseph Freud.

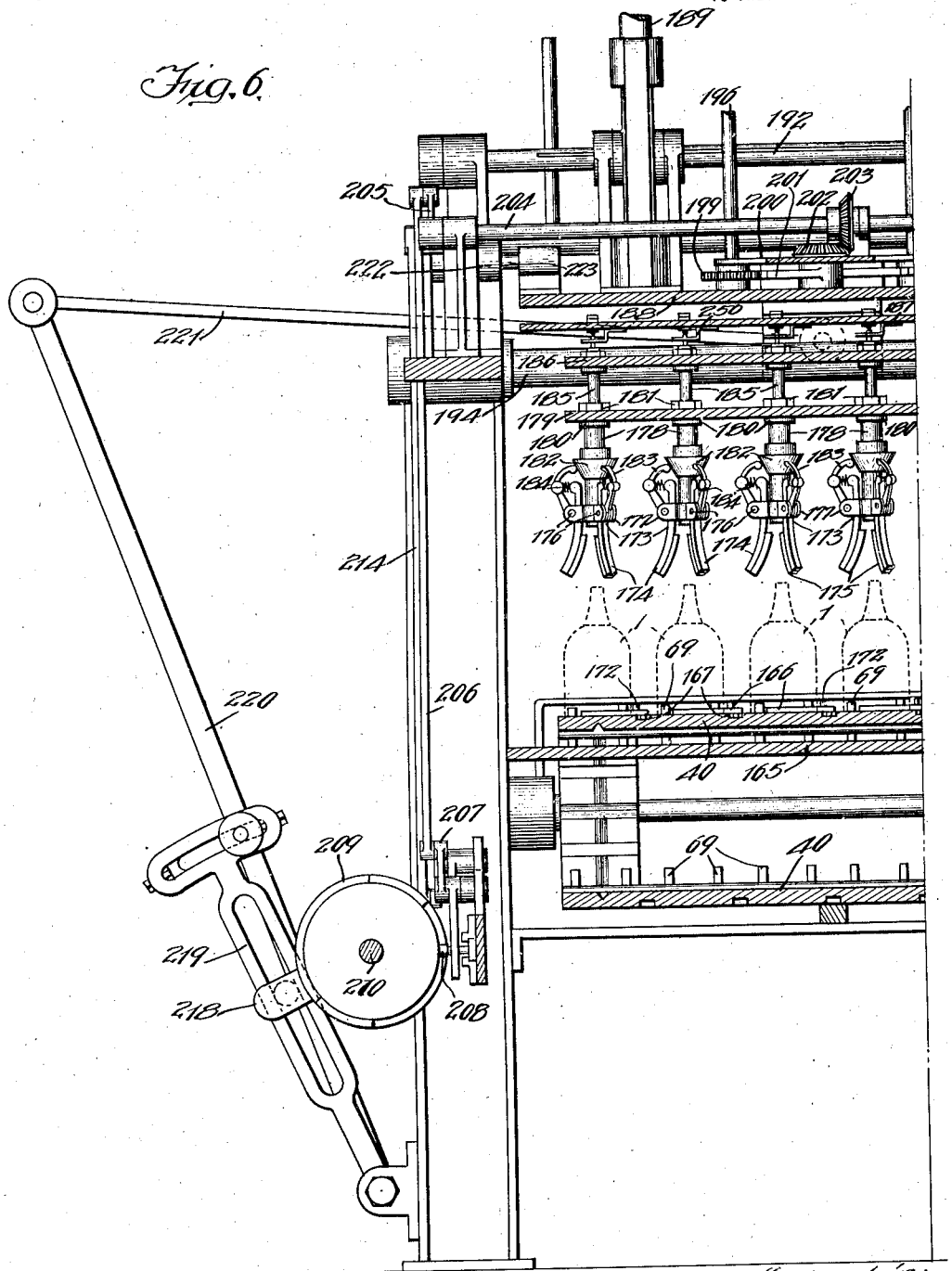

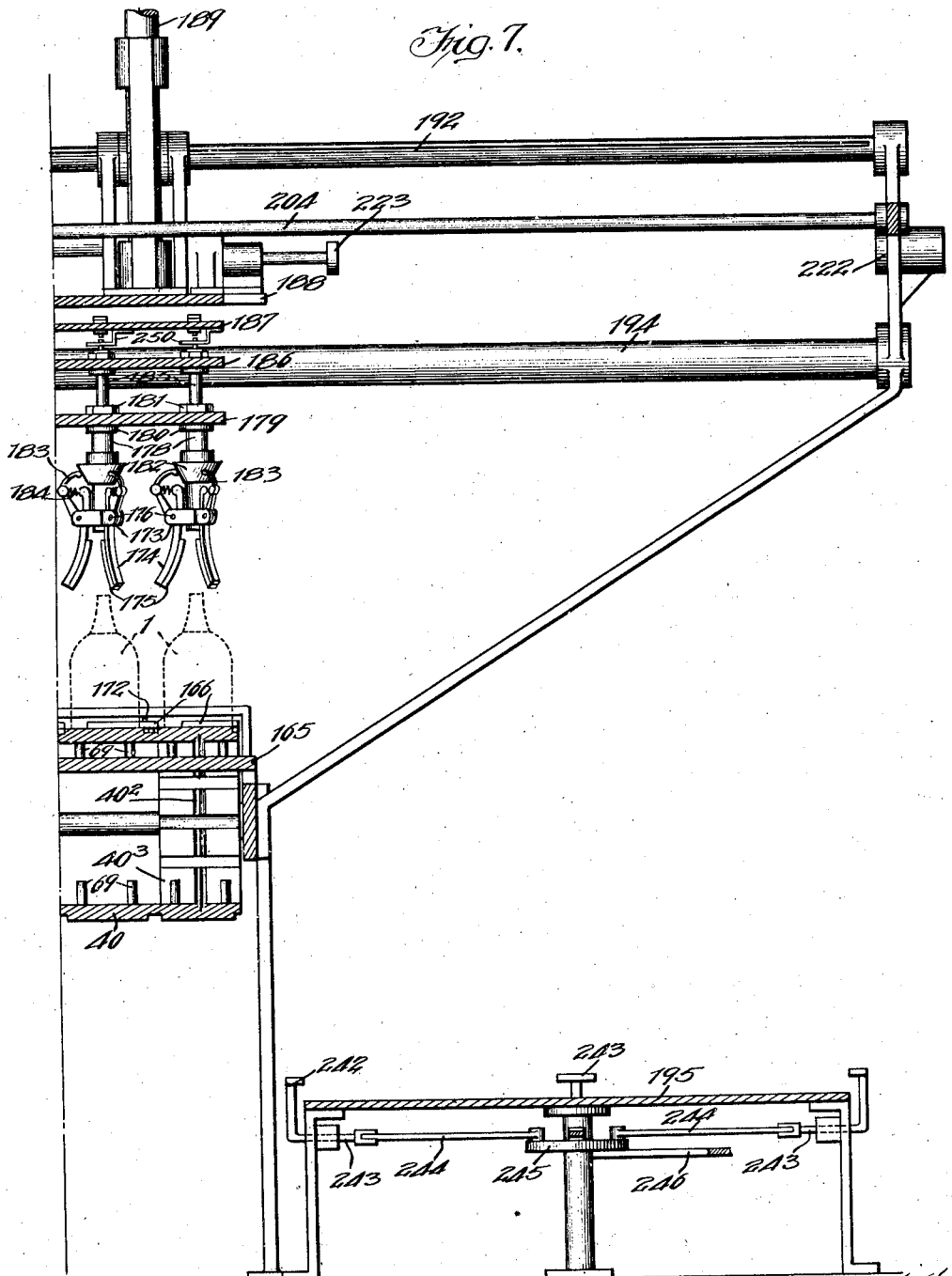

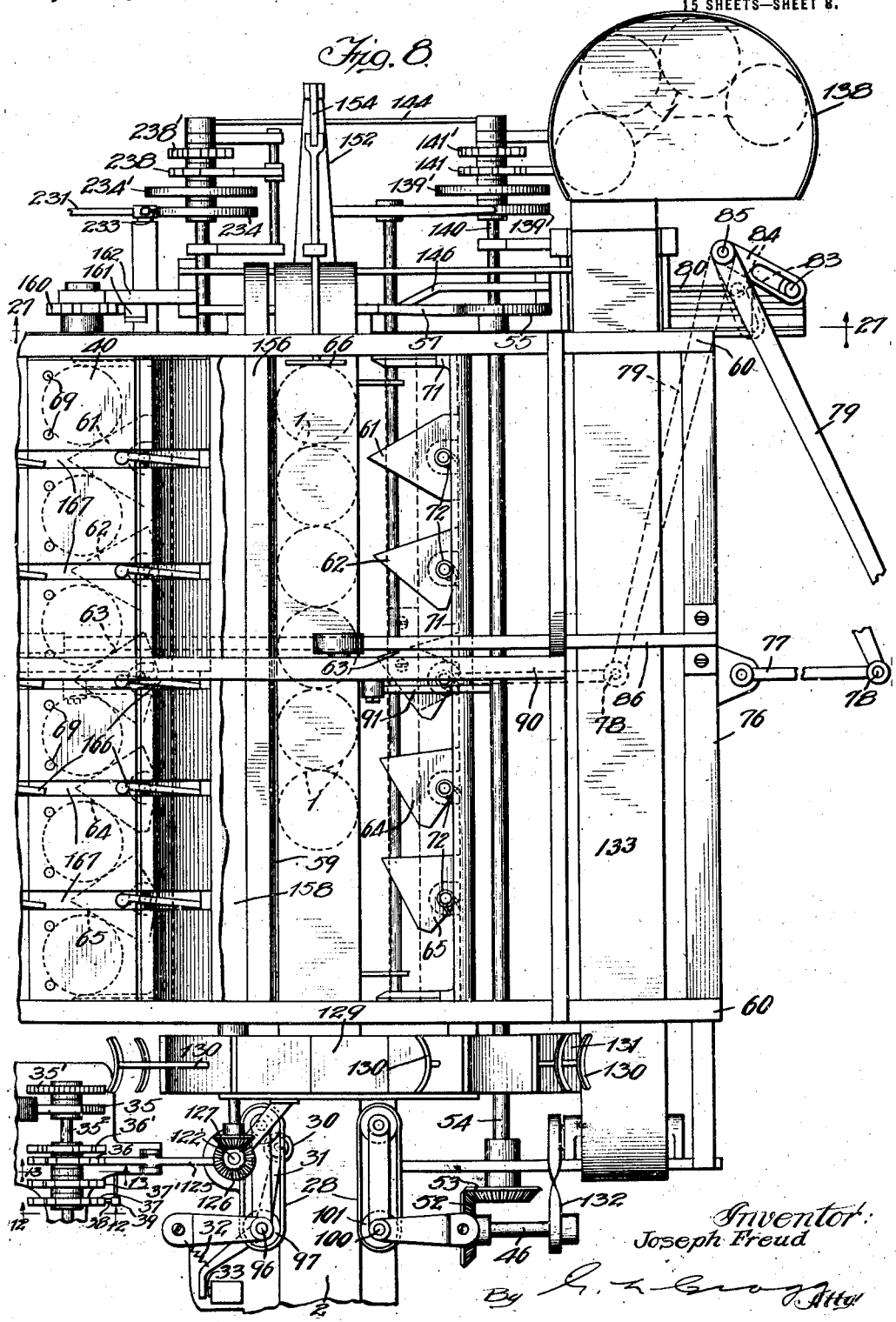

J. FREUD.
CONVEYING MECHANISM.
APPLICATION FILED DEC. 26, 1917.
1,330,524.
Patented Feb. 10, 1920.
15 SHEETS—SHEET 9.
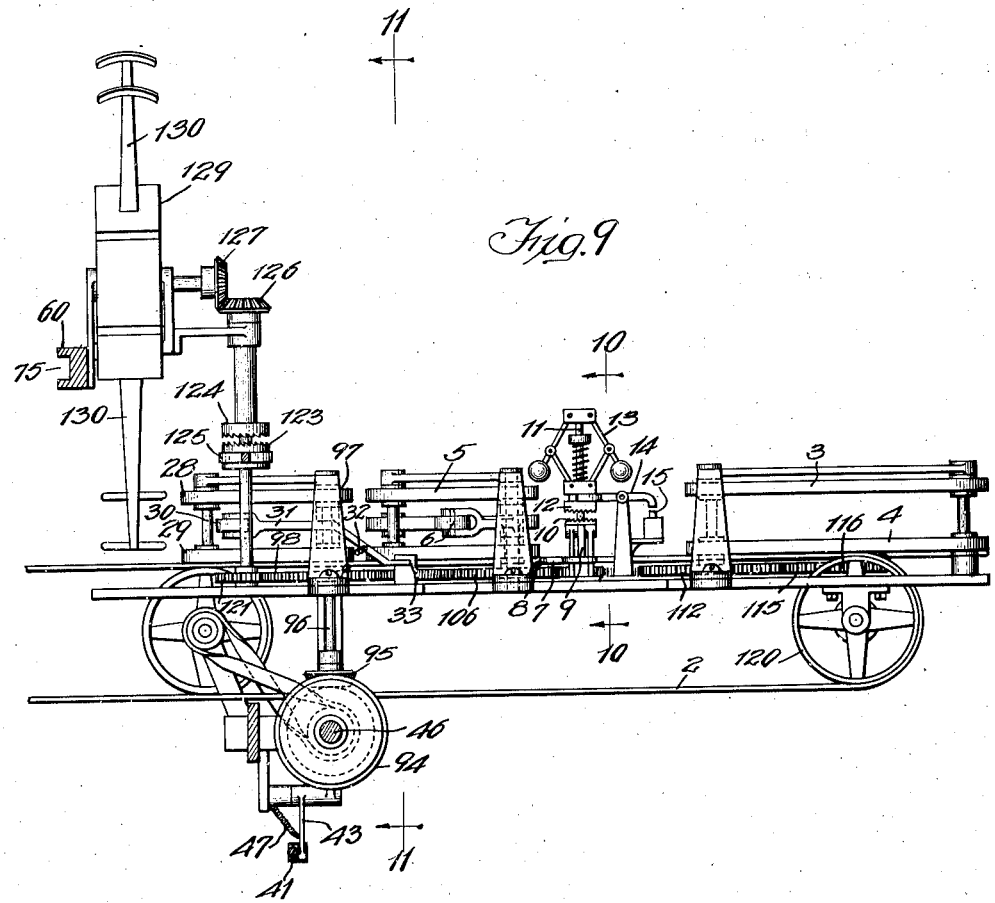
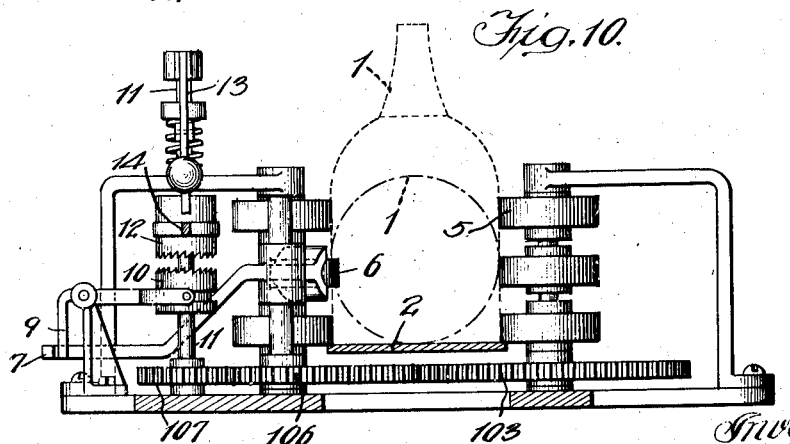
Inventor
Joseph Freud
By _____ Atty.

J. FREUD.
CONVEYING MECHANISM.
APPLICATION FILED DEC. 26, 1917.
1,330,524.
Patented Feb. 10, 1920.
15 SHEETS—SHEET 10.
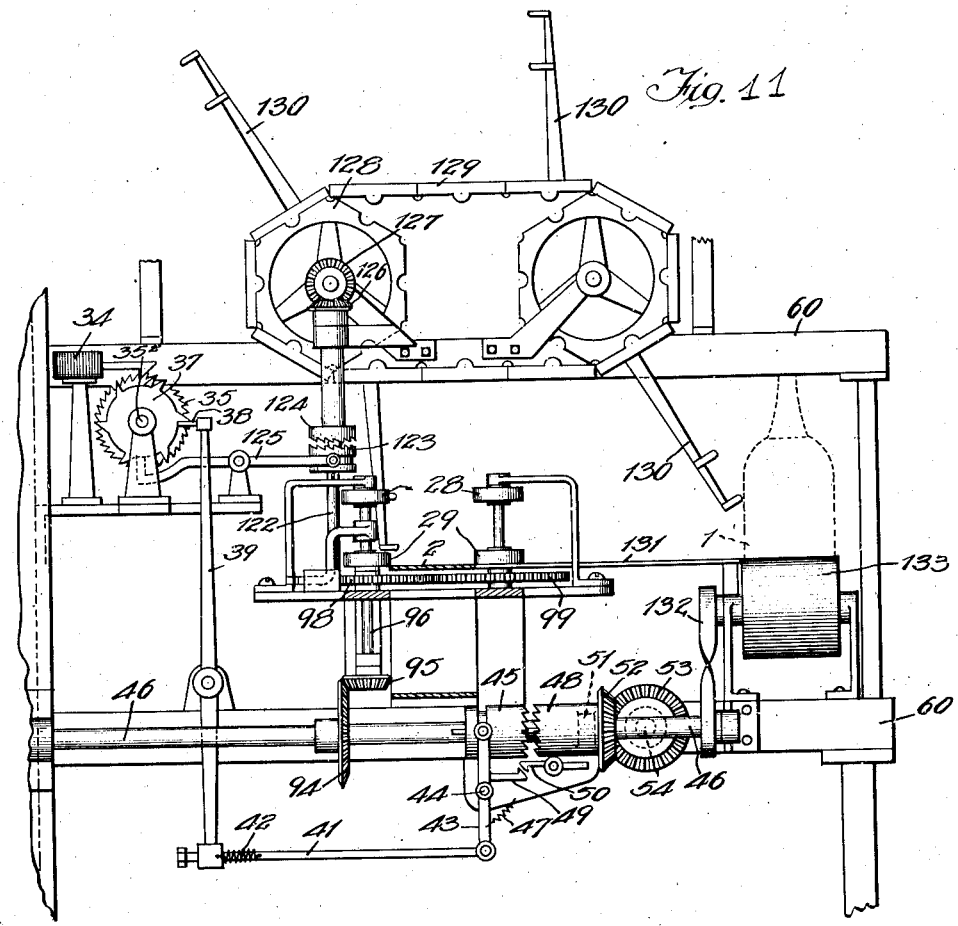
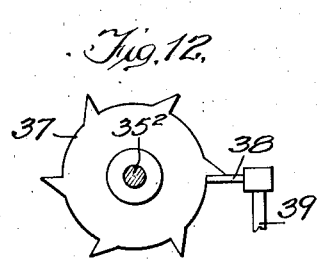
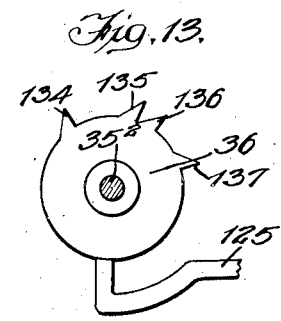
Inventor:
Joseph Freud J. FREUD.
CONVEYING MECHANISM.
APPLICATION FILED DEC. 26, 1917.
1,330,524.
Patented Feb. 10, 1920.
15 SHEETS—SHEET 11.
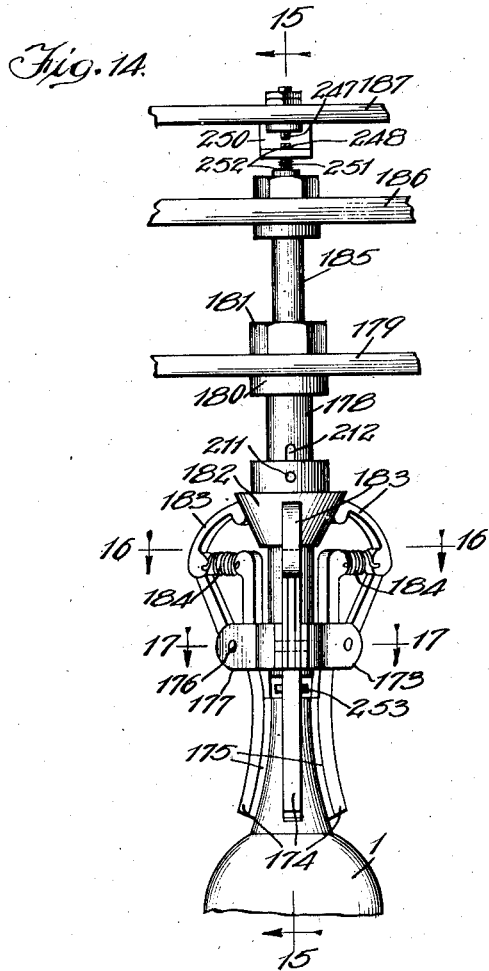
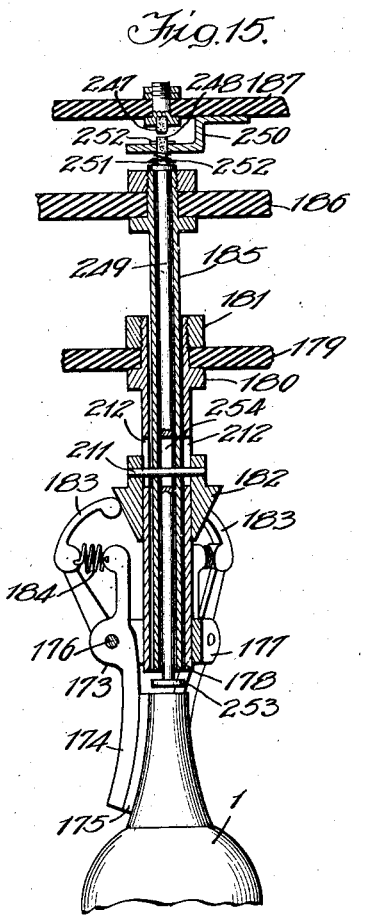
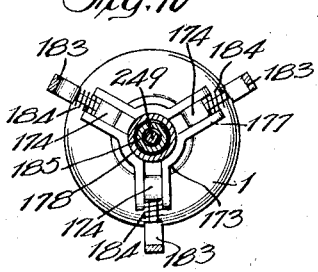
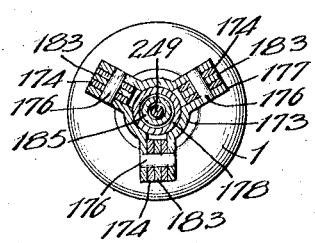
Inventor:
Joseph Freud
By *[signature]*
Atty.

J. FREUD.
CONVEYING MECHANISM.
APPLICATION FILED DEC. 26, 1917.

1,330,524.

Patented Feb. 10, 1920.
15 SHEETS—SHEET 12.

Inventor:
Joseph Freud
By [signature]
Atty.

J. FREUD.
CONVEYING MECHANISM.
APPLICATION FILED DEC. 26, 1917.

1,330,524.

Patented Feb. 10, 1920.
15 SHEETS—SHEET 13.

Inventor:
Joseph Freud

J. FREUD.
CONVEYING MECHANISM.
APPLICATION FILED DEC. 26, 1917.

1,330,524.

Patented Feb. 10, 1920.
15 SHEETS—SHEET 14.

Inventor:
Joseph Freud

J. FREUD.
CONVEYING MECHANISM.
APPLICATION FILED DEC. 26, 1917.
1,330,524.
Patented Feb. 10, 1920.
15 SHEETS—SHEET 15.
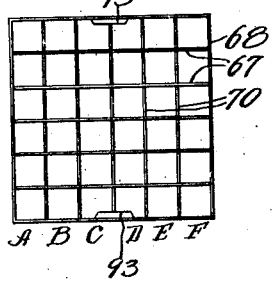
Fig. 29.
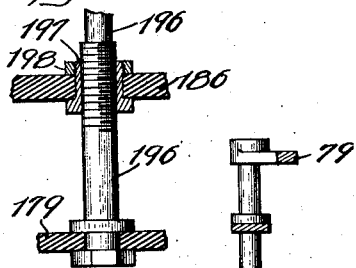
Fig. 30.
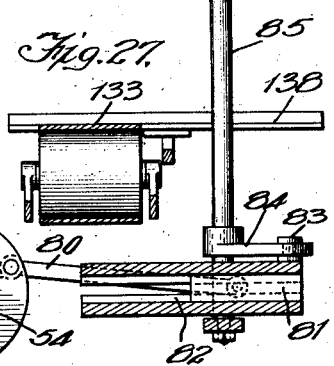
Fig. 27.
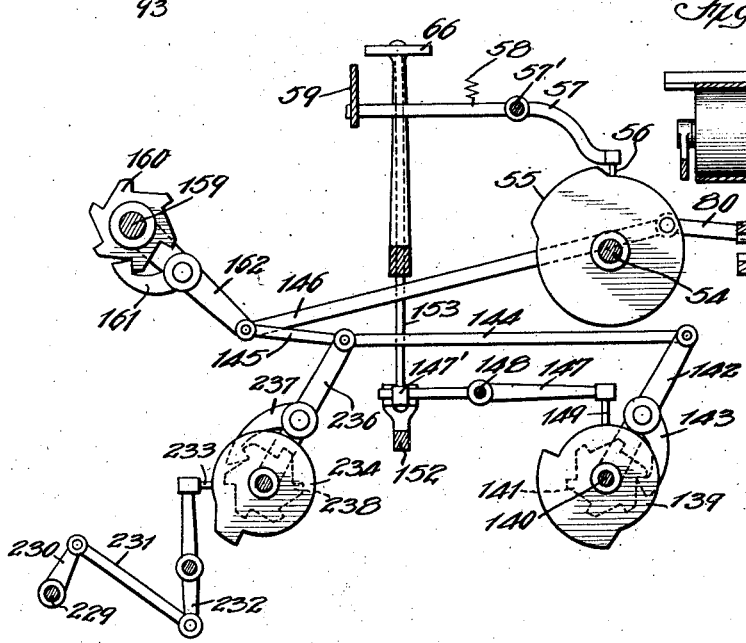
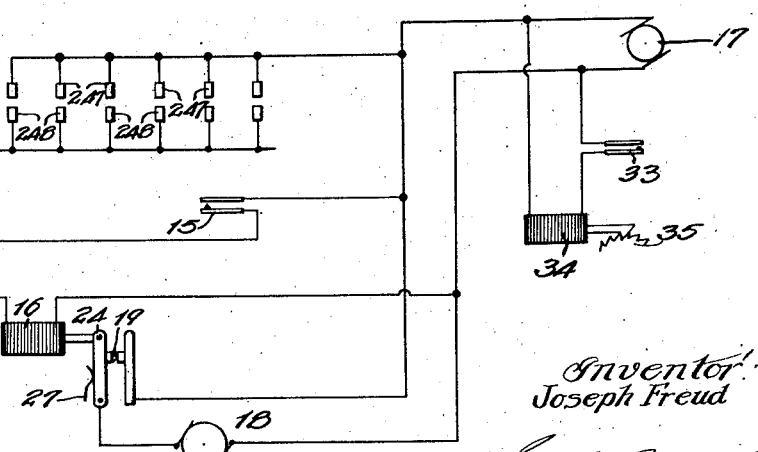
Fig. 28.
Inventor
Joseph Freud
By
Atty.

UNITED STATES PATENT OFFICE.

JOSEPH FREUD, OF CHICAGO, ILLINOIS.

CONVEYING MECHANISM.

1,330,524.     Specification of Letters Patent.    Patented Feb. 10, 1920.

Application filed December 26, 1917. Serial No. 208,964.

*To all whom it may concern:*

Be it known that I, JOSEPH FREUD, citizen of the United States, residing at Chicago, in the county of Cook and State of Illinois, have invented a certain new and useful Improvement in Conveying Mechanism, of which the following is a full, clear, concise, and exact description.

My invention relates to conveying mechanism and has a number of objects and advantages. The mechanism of my invention is particularly adapted to the transfer of bottles to boxes in which they are to be packed although other articles than bottles may be transferred by means of my invention.

In accordance with one feature of my invention there is a belt or other support for feeding the bottles or other articles to the machine and another belt or belts having stretches which margin the longitudinal edges of the feeding belt to engage the bottles or other articles upon the feeding belt and position them thereupon.

Means are also desirably employed for checking the travel of the feeding belt or support and which means is operable by an article when abnormally positioned upon the feeding belt. It is desirable to place the bottles upright upon the feeding belt but if any bottle should fall flat upon the belt the machine will be stopped by means of this part of my invention.

The machine of my invention also desirably includes two angularly related belts or supports, one of these belts being the feeding belt hitherto mentioned and the second a belt upon which rows of articles are assembled and which rows are placed upon the second belt one by one by being pushed laterally from the feeding belt. Suitable counting mechanism is employed whereby a definite number of bottles or other articles is assembled to form each row upon the feeding belt before such row is transferred to the second belt whereafter the second belt is operated by the counting mechanism to effect the travel of the rows of bottles thereupon and to place a new portion thereof in position to receive a fresh row of bottles. The mechanism for moving the bottles from the feeding belt onto the second belt is desirably in the nature of a group of relatively movable wedging pushers that serve to spread the bottles apart to provide places therebetween that correspond to the spaces that are to intervene between the bottles when boxed. This work is performed by the wedging pushers before they serve to transfer a row of bottles from the feeding belt to the second belt and the step by step movement of the second belt is such that the rows of bottles are properly spaced apart corresponding to the spaces between these rows that is to occur when the bottles are boxed.

The belt that is second to receive the bottles is desirably provided with bottle positioning pins and swinging arms for holding the bottles in engagement with positioning pins. These positioning pins and arms are desirably withdrawn when not functioning.

After a complement of rows of bottles has been collected upon the second conveying belt or support, clutching mechanism is lowered into engagement with the necks of the bottles and after this clutching mechanism has gripped the bottles such mechanism is transferred, together with the bottles gripped thereby, to position the bottles over the box that is to contain them whereafter, the clutching mechanism and the bottles are lowered to deposit the bottles into the box whereupon the clutches are released and withdrawn to their initial position over the second belt. There are some boxes which carry handles inside of the boxes and which handles partially cover some pockets in the boxes that are to receive bottles. These handles would interfere with the deposit of bottles by machinery into the pockets partially covered by the handles. I therefore provide means for shortening the rows of bottles that occur where the handles are located, this function being desirably performed by pushing some of the bottles collected upon the first or feeding belt from this belt onto a receiving platform from which they are removed by an attendant who deposits them in the pockets in the box that are partially covered by the box handles. It sometimes happens that broken bottles are returned with previously used boxes and which broken bottles should be removed before new bottles are boxed. I provide means for checking the operation of the conveying mechanism and operable by the broken bottles encountered by the bottles being deposited.

In the foregoing preamble I have frequently referred specifically to bottles as being the articles upon which the mechanism operates but it is to be understood that my invention is not to be limited to the nature of the articles operated upon. There are other features and advantages of my invention which will fully appear and which, together with the foregoing objects of my invention are desirably realized by the mechanism hitherto generally described but to the specific details of which mechanism my invention is not to be limited.

Figure 2:
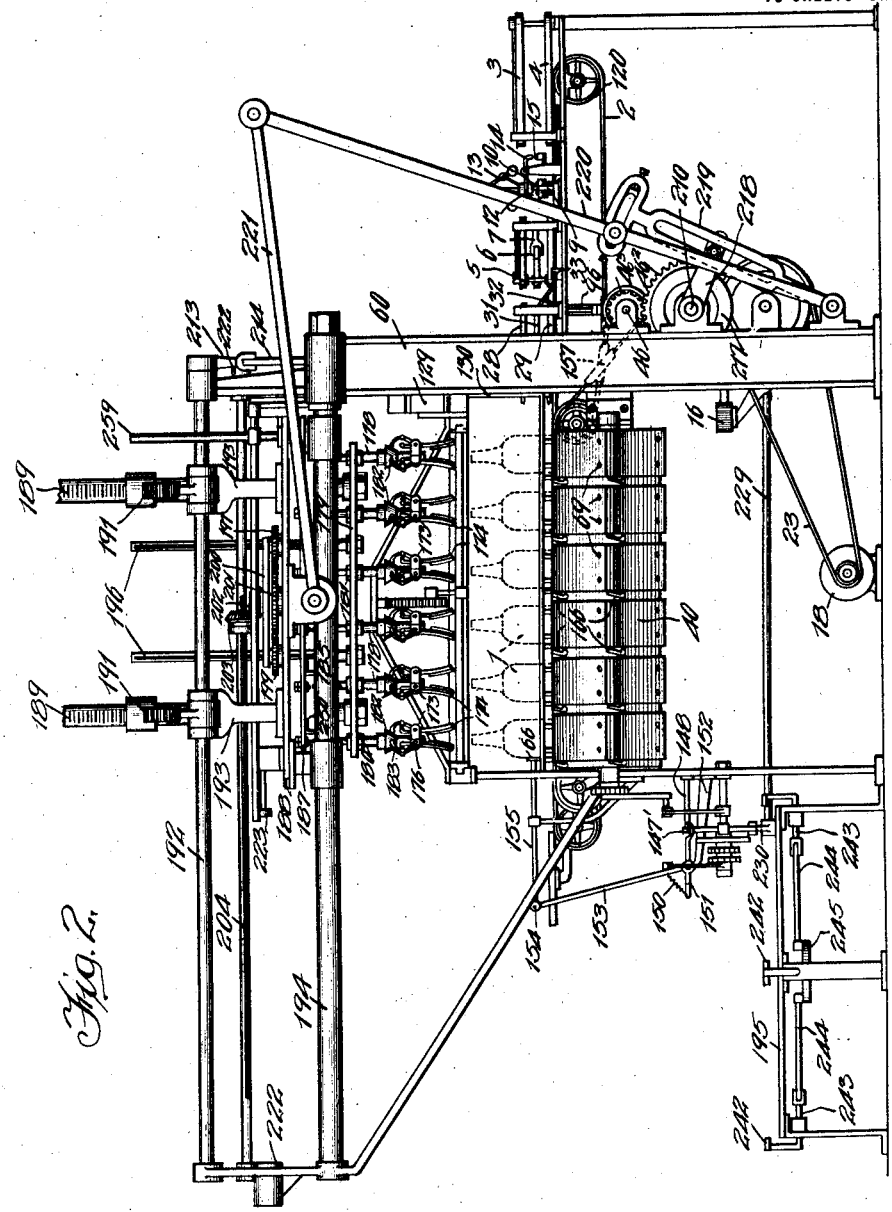
Figure 3:
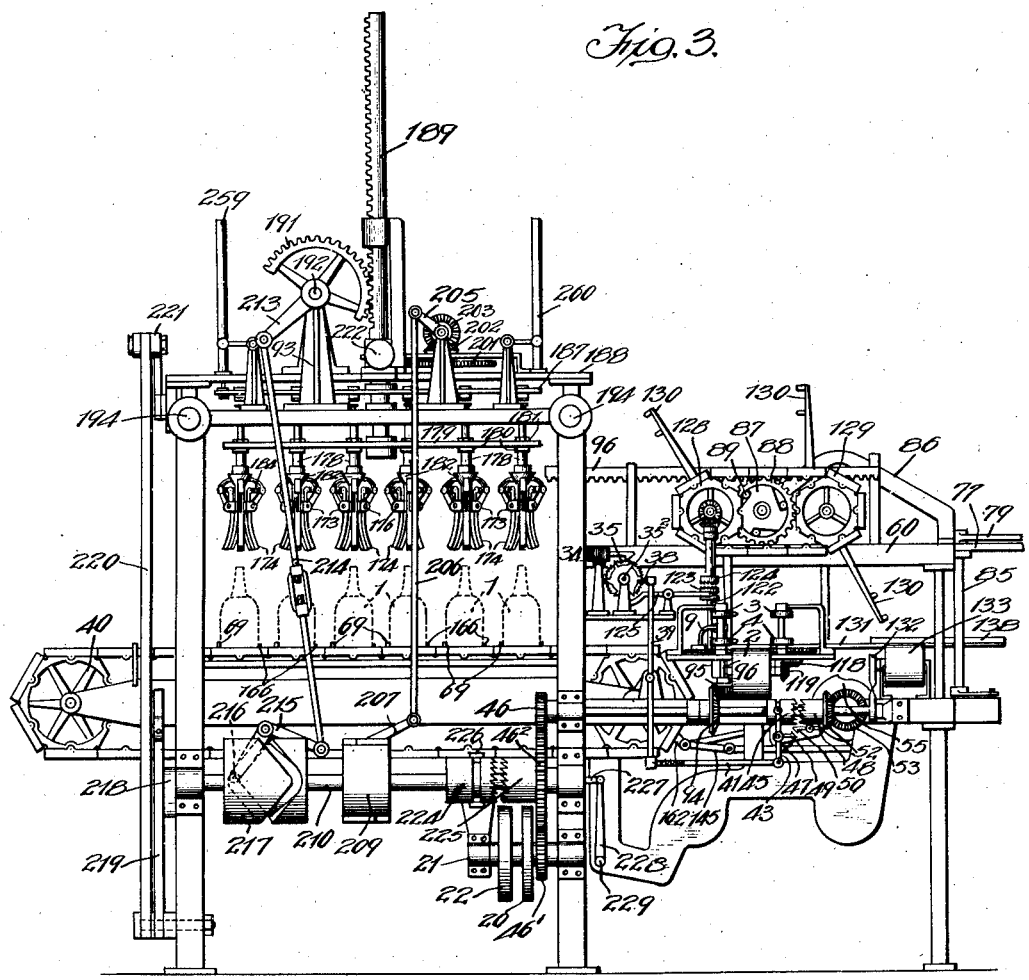
Figure 4:
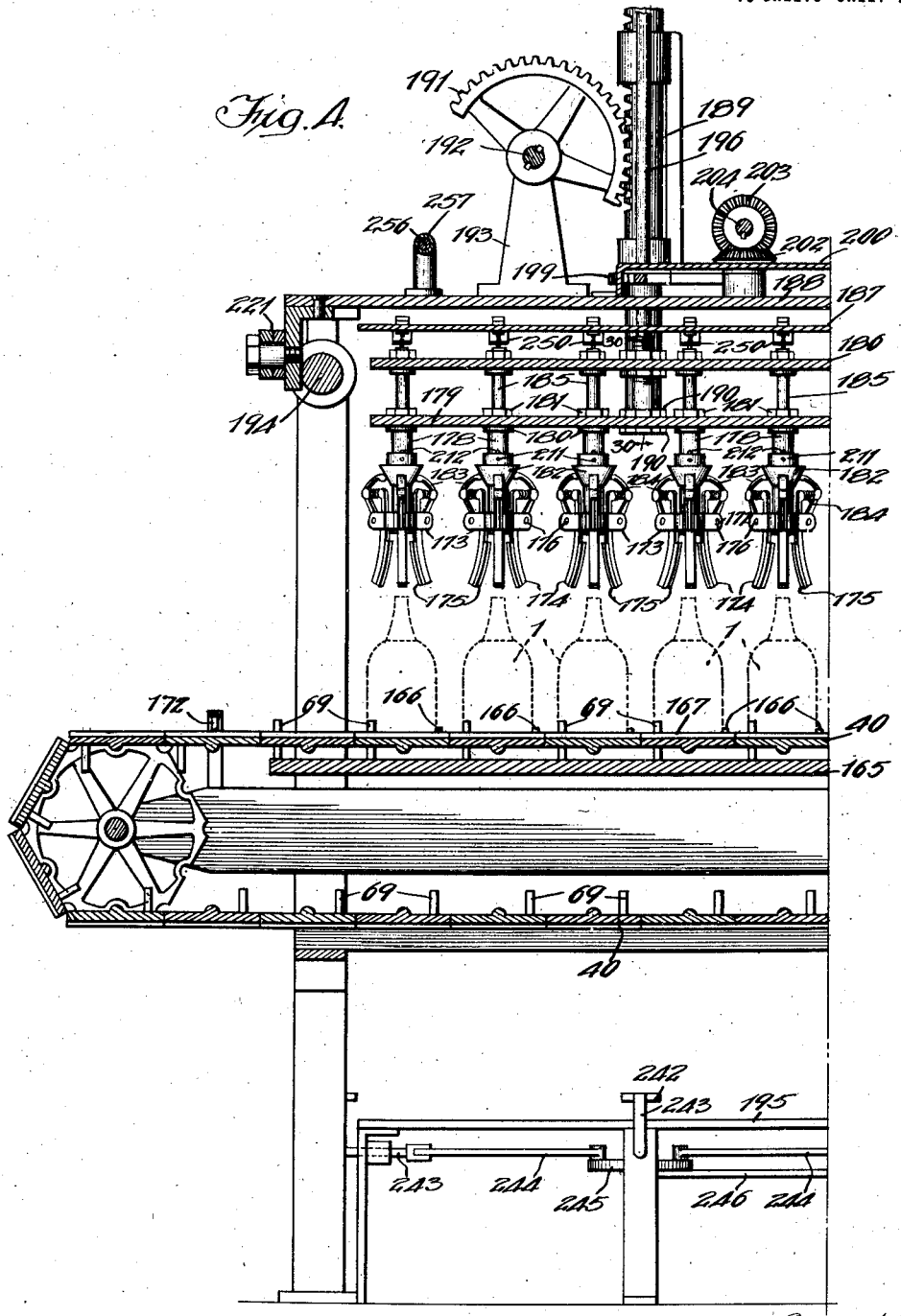
Figure 5:
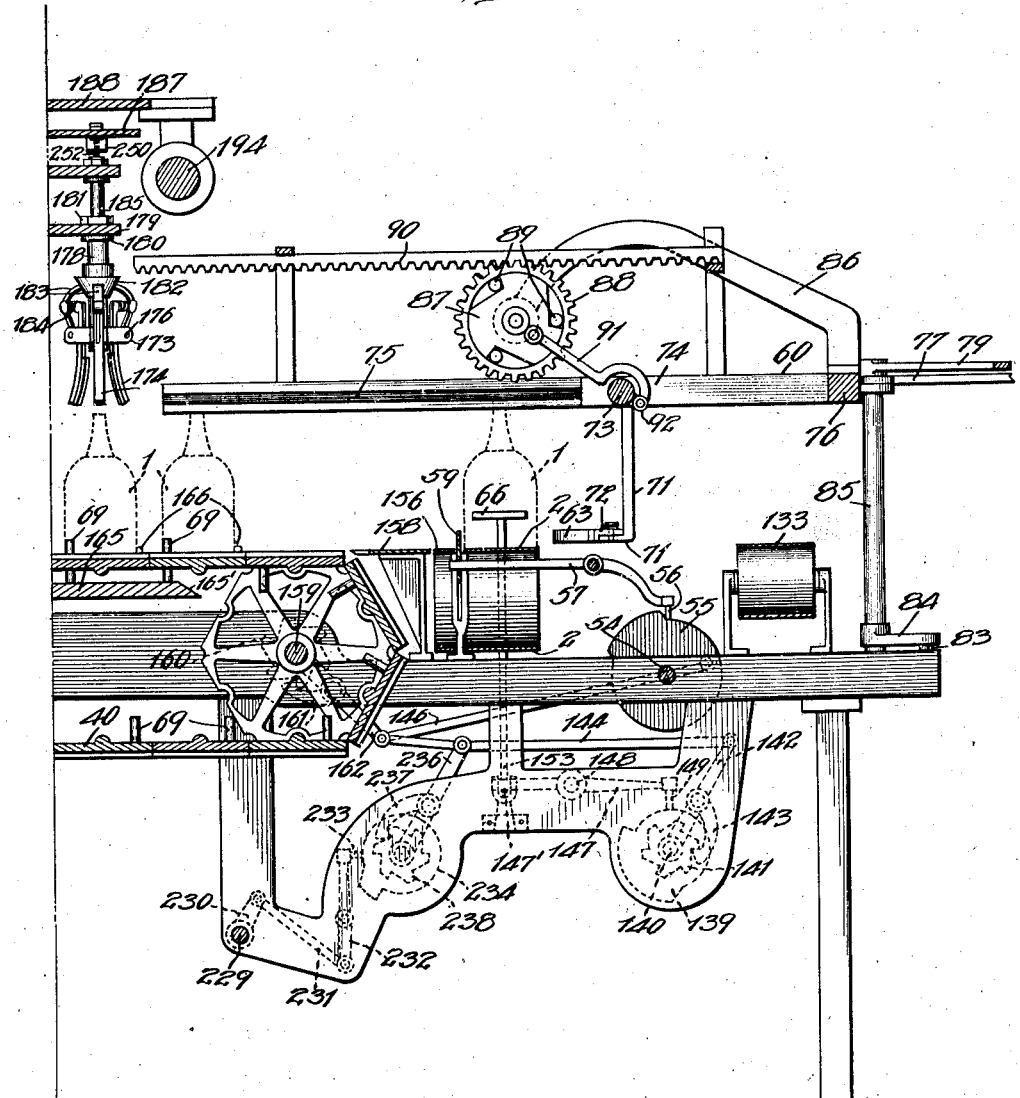
Figure 18:
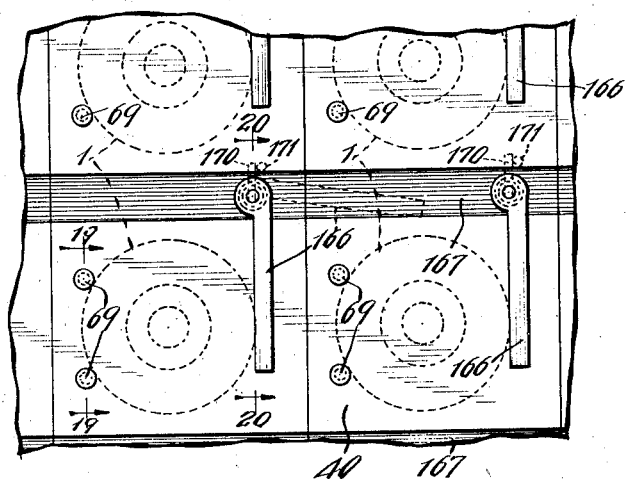
Figure 19:
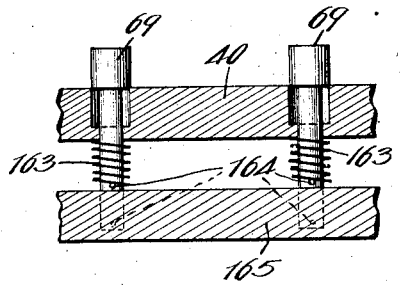
Figure 20:
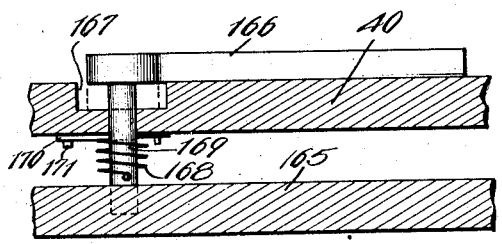
Figure 21:
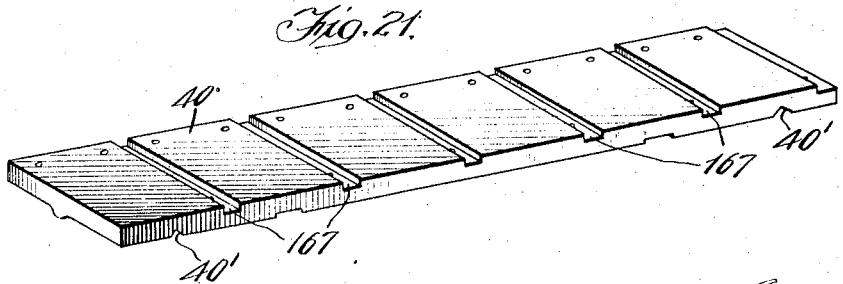
Figure 22:
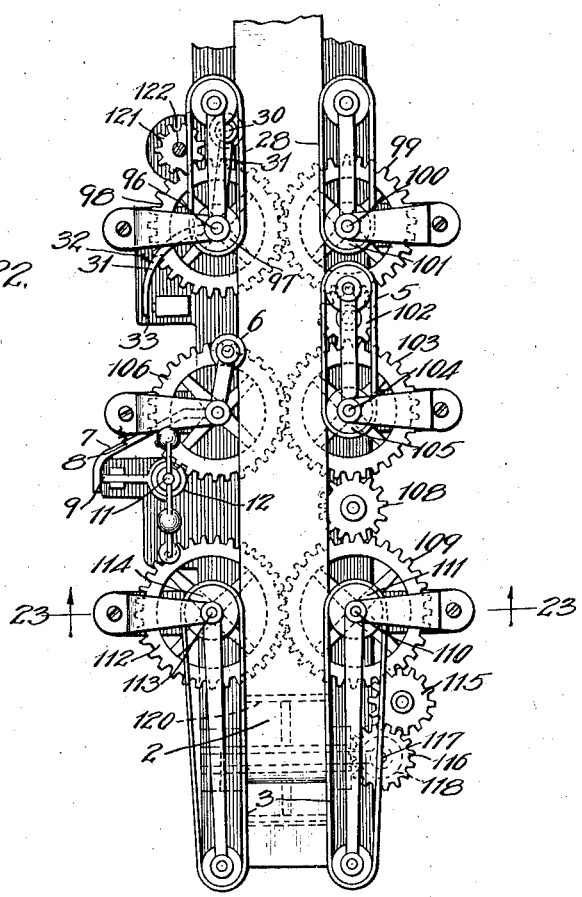
Figure 23:
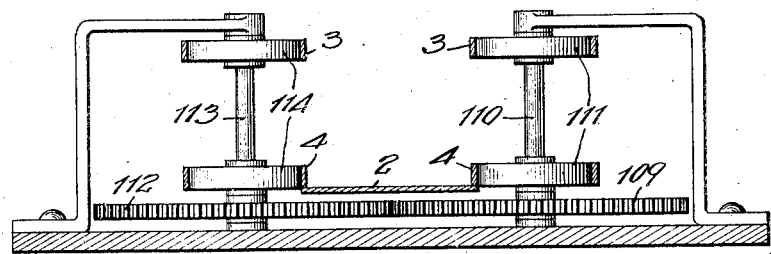
Figure 24:
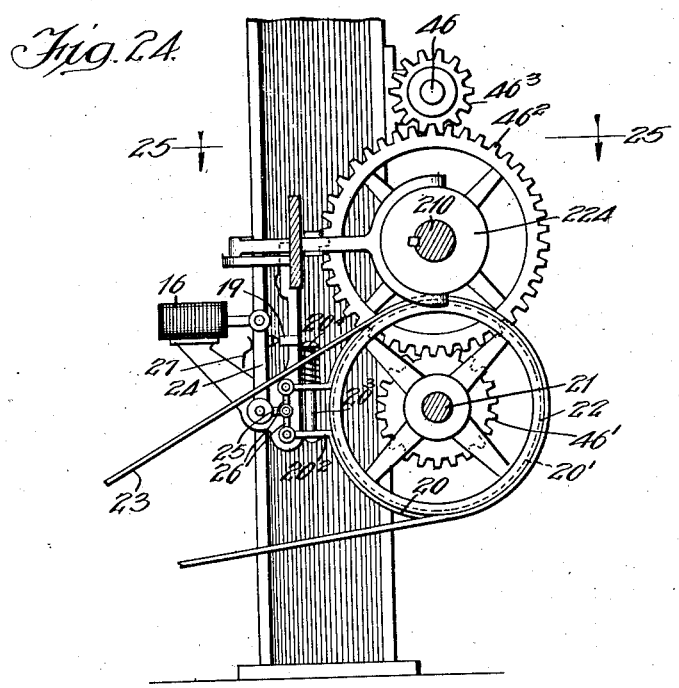
Figure 25:
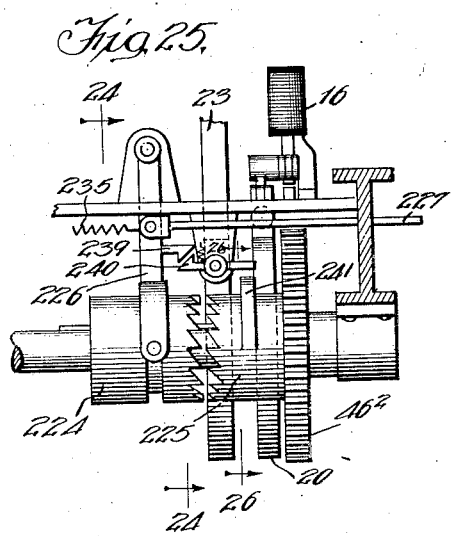
Figure 26:
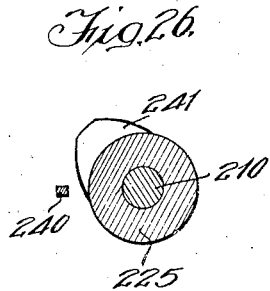

I will explain my invention more fully by reference to the accompanying drawings showing the preferred embodiment thereof and in which Figure 1 is a plan view of the machine constructed in accordance with the preferred embodiment of the invention; Fig. 2 is one side elevation of the machine; Fig. 3 is another side elevation of the machine; Figs. 4 and 5, taken collectively and read with the right hand end of Fig. 4 in alinement with the left hand end of Fig. 5, constitute a sectional view on line 4—5 of Fig. 1; Figs. 6 and 7, taken collectively and read with the right hand end of Fig. 6 in alinement with the left hand end of Fig. 7, constitute a sectional view on line 6—7 of Fig. 1; Fig. 8 is a plan view of a part of the right hand portion of the mechanism employed; Fig. 9 is a sectional view on line 9—9 of Fig. 1; Fig. 10 is a sectional view on line 10—10 of Fig. 9; Fig. 11 is a sectional view on line 11—11 of Fig. 9; Fig. 12 is a sectional view on line 12—12 of Fig. 8; Fig. 13 is a view on line 13—13 of Fig. 8; Fig. 14 is a detail view illustrating a bottle-engaging mechanism in association therewith; Fig. 15 is a view on line 15—15 of Fig. 14; Fig. 16 is a view on line 16—16 of Fig. 14; Fig. 17 is a view on line 17—17 of Fig. 14; Fig. 18 is a plan view illustrating a part of a conveyer belt upon which the bottles are assembled preparatory to their transfer to the box that is to receive them; Fig. 19 is a view on line 19—19 of Fig. 18; Fig. 20 is a view on line 20—20 of Fig. 18; Fig. 21 is a perspective view of a component link of the bottle supporting conveyer belt; Fig. 22 is a plan view of feeding mechanism as employed for transferring bottles to the machine; Fig. 23 is a view on line 23—23 of Fig. 22; Fig. 24 is a view on line 24—24 of Fig. 25; Fig. 25 is a view on line 25—25 of Fig. 24; Fig. 26 is a view on line 26—26 of Fig. 25; Fig. 27 is a view on line 27—27 of Fig. 8; Fig. 28 is a diagram illustrating a circuit arrangement that is preferably employed; Fig. 29 illustrates one type of box that is to be filled with bottles; and Fig. 30 is a view on line 30—30 of Fig. 4.

Like parts are indicated by similar characters of reference throughout the different figures.

The feeding or conveying mechanism, by means whereof the bottles 1 or other articles are fed to the machine, is inclusive of a traveling support that is preferably a horizontal belt 2 (driven through the intermediation of gearing later to be described) which extends between the point of deposit for the bottles that are to be fed to the machine to and beyond the place at which the bottles are to be transferred from the feeding mechanism to the machine. The bottles, coming from a labeling machine or elsewhere, are placed upright by hand or otherwise upon the outermost end of the upper stretch of the traveling belt 2 and are maintained in their upright positions in the initial portion of the travel of the bottles by means of the inner stretches of the symmetrically arranged traveling belts 3 and the inner stretches of the symmetrically arranged traveling belts 4, these belts 3, 4 margining the longitudinal edges of the belt 2 and being driven by gearing later to be set forth. The belts 4 are located to engage the bottles below the labels thereon that may be wet if they have been freshly applied to the bottles, while the belts 3 are located to engage the bottles above the labels thereon whereby the belts 3, 4 are prevented from marring the labels. The bottles are carried by the belt 2 beyond the belts 3, 4 and enter between the inner stretches of the traveling belts 5 (driven by gearing to be later set forth) that margin one longitudinal edge of the belt 2 and a roller 6 at the opposite edge of the belt 2 and which roller is carried upon one arm of a bell crank 7 that is movable horizontally. The roller 6 occupies a level between the belts 3 and 4 and is in the plane of the horizontal diameter of any bottle that may have been accidentally turned to a horizontal position to lie flat upon the feeding upper stretch of the belt 2, Fig. 10. A spring 8 operates upon the bell crank 7 to hold the roller 6 in the path of movement of the bottles so that as each bottle encounters the roller 6 such roller is pressed outwardly to cause counter-clockwise movement of the bell crank 7 (Fig. 22). The duration of engagement of each upright bottle with the roller 6 is so short as to occasion no operating change in the mechanism but if the bottle engaging said roller has accidentally been laid flat upon the belt 2 (as shown by the dot and dash circle in Fig. 10) the duration of engagement of the bottle with said roller is sufficiently extended to cause an adjustment of mechanism that will stop the machine until an attendant has raised the fallen bottle to its upright position. The belts 5 hold the bottles in position to be engaged by the roller 6 and prevent this roller from moving the bottles laterally of the belt 2 to any material extent.

The end of the bell crank 7 companion to that which carries the roller 6 engages the bell crank 9, that is movable vertically, when the bell crank 7 is moved counterclockwise. The bell crank 9 has pin and groove connection with a clutch member 10 that is splined upon a motor driven shaft 11 that is turned by gearing later to be set forth, and which clutch member 10 is engageable with a complemental clutch member 12 loose upon said shaft. The engagement of the roller 6 by an upright bottle is of insufficient duration to cause operative engagement between the clutch members 10 and 12 but the protracted engagement between the roller 6 and a bottle lying flat upon the belt 2 will cause and maintain operating engagement between the clutch members 10 and 12 to cause the clutch member 12 to rotate with the motor driven shaft 11. The clutch member 12 is in actuating relation with the fly ball switch actuating mechanism 13 and when this clutch member 12 is rotated the switch actuating mechanism 13 will operate to move the contact 14 against the contact 15 to include the solenoid or other electro-magnet 16 in circuit with a source of current 17, Fig. 28. The magnet 16, when energized, serves to dissociate the machine operating prime mover from the machine.

In the preferred embodiment of the invention the prime mover is an electric motor 18, in which event the magnet 16 serves, when energized, to separate the contacts of the switch 19 that is serially included in circuit between the motor 18 and the generator 17. The machine will stop while a bottle lying flat upon a belt 2 is in engagement with the roller 6.

In addition to opening the circuit of the motor the energized magnet 16 also desirably effects or permits the application of a brake quickly to stop the operation of the machine. This brake includes a brake band 20 surrounding a brake pulley $20^1$ that is fixed upon the shaft 21 which is driven by a pulley 22, which is turned by a belt 23 driven by the motor 18, Figs. 2 and 24. The brake band has outsetting ears $20^2$ that are threaded by a bolt $20^3$. A projecting end of this bolt is surrounded by a coiled spring $20^4$ which is prevented from or is permitted to force the ears $20^2$ toward each other to apply the brake band to the brake pulley $20^1$. The lever 24, pivoted at its lower end, is operated by the magnet 16 and carries one of the contacts of the switch 19. This lever carries an extension 25 that serves to hold the brake band expanding links 26 in alinement when the magnet 16 is not energized, at which time the spring $20^4$ is prevented from applying the brake band 20 to the brake pulley $20^1$. When the magnet 16 is energized the lever 24 is moved to a position in which the links 26 are thrown out of alinement whereupon the spring $20^4$ is free to apply the brake band.

When the attendant rights the bottle the spring 8 (assuming that the bottle has properly cleared the roller 6) will restore the bell crank 7 and cause the separation of the clutch member 10 from the clutch member 12 whereupon the contacts 14 and 15 will be separated to open the circuit of the magnet 16 and permit the closure of the switch 19 by the spring 27 and the consequent establishment of the operating circuit of the motor 18. After the bottles clear the belts 5 they enter between the inner stretches of the symmetrically arranged belts 28 (driven by the motor through the intermediation of gearing later to be set forth) and the inner stretches of the symmetrically arranged belts 29 the inner stretches of these belts margining the longitudinal edges of the belt 2. The belts 28 are in the same horizontal plane with the belts 3 and the belts 29 are in the same horizontal plane with the belts 4 to clear the labels upon the bottles. As each bottle is about to pass from between the belts 28 and the belts 29 it encounters a roller 30 upon a bell crank 31 whereby this bell crank is moved against the force of spring 32 to close the contacts of switch 33. This switch is in serial relation with the solenoid or other electro-magnet 34 and the generator 17 and serves to establish a circuit for said magnet each time a bottle engages the roller 30 in its passage to the machine. The magnet 34 is provided for operating one of the counting ratchet wheels 35, $35^1$. The ratchet wheel 35 has thirty-six teeth and is employed when thirty-six bottles are to be packed in a box. The ratchet wheel $35^1$ has twenty-four teeth and is to be employed when twenty-four bottles are to be packed in a box. The employed ratchet wheel is operated step by step as the bottles successively engage the roller 30 and when a full complement of bottles has been passed to the machine the employed wheel 35 or $35^1$ is turned, step by step, a complete revolution.

On the same shaft $35^2$ with the counting wheels 35 $35^1$ are two star wheels 36, 37 that are operated when the wheel 35 is employed and two star wheels $36^1$, $37^1$ which are operated when the wheel $35^1$ is employed. The shaft $35^2$ that carries all of these wheels is adjustable longitudinally of itself in order to bring one or the other of the wheels 35, $35^1$ into coöperative relation with the magnet 34. Further operation of the machine will be described as though the wheels 35, 36 and 37 are employed.

The wheel 37 (also the wheel $37^1$) has six equidistant teeth projecting from its periphery which are brought successively into engagement with the pin 38 upon the upper end of a rocking lever 39. This engagement happens each time a row of bottles is placed upon the belt 2 and is for the purpose of setting machinery into operation that will move each row of bottles laterally of the belt 2 unto the upper stretch of a traveling support that is preferably a conveyer belt or chain 40 that preferably travels at right angles to belt 2. The conveyer belt 40 is employed for collecting all the bottles that are to be disposed in a box and in the same relative positions they occupy when in the box, the mechanism whereby the bottles are transferred from the belt 40 to the box being hereinafter set forth.

A link 41 is disposed transversely of the lever 39 and has sliding connection therewith. A spring 42 yieldingly connects the lever 39 with one end of the link 41. The other end of the link 41 is connected with a clutch lever 43 which is pivoted at 44. This clutch lever is in pin and groove connection with a clutch member 45 that has splined connection with a constantly rotating motor driven shaft 46 (driven by the gearing $46^1$, $46^2$ and $46^3$ intervening between the shafts 21 and 46). The spring 47, when free to operate, moves the clutch member 45 to the left to separate it from a complemental clutch member 48 that is loose upon the shaft 46. The wheels 35 etc. (Fig. 11) turn counter-clockwise and each time a tooth upon the star wheel 37 strikes the pin 38 the lever 39 is turned clockwise and operates through the spring 42 to turn the clutch lever 33 clockwise to bring the clutch member 45 into engagement with the clutch member 48. The clutch lever 43 carries a latch 49 that is caught by a catch 50 when this clutch lever 43 is moved to engage the clutch member 45 with the clutch member 48, the elements 49, 50 maintaining the clutch members 45, 48 in engagement until the shaft 46 has made one revolution, the shaft then bringing the cam 51 into engagement with the tail of the catch to disengage this catch from the latch 49 whereupon the spring 47 will separate the clutch members 45, 48 to the extent permitted by the lever 39 and the star wheel 37. Such a complete revolution of the motor driven shaft 46 occurs for each sixth revolution of the wheel 37 and during such revolution of the shaft 46 the row of bottles that have been collected upon the belt 2 is moved unto the upper stretch of the belt 40. When the clutch members 45 and 48 are in engagement the intermeshed bevel pinions 52 and 53 are driven, the pinion 52 being fixed upon the clutch member 48. The bevel pinion 53 is fixed upon a shaft 54 (Figs. 4, 11 and 27). A cam 55 is fixed upon the shaft 54 and is engaged by a pin 56 which is upon one end of an intermediately pivoted lever 57, the pin 56 being maintained in engagement with the cam by a spring 58. The part of the lever 57 to the left of the lever pivot $57^1$ is bifurcated, the outer ends of the bifurcations of this lever loosely carrying a gate 59 that margins the portion of the belt 2 that is moving between the side members 60 of the frame of the machine. This gate is maintained in an elevated position while a row of bottles is being collected upon the belt 2 and after such row of bottles has been collected the gate 59 is dropped sufficiently to bring its upper edge into the plane of the upper stretch of the belt 2 or a little below such plane, a result which is accomplished by the engagement of the rise of the cam 55 with the pin 56. The engagement of the pin 56 with the rise of the cam 55 is maintained during the time that the collected row of bottles is being moved to the left (Fig. 8) from the belt 2 upon the conveyer belt 40. After the transfer of the row of bottles to said belt has been effected the rise of the cam 55 is passed out of engagement with the pin 56 whereupon the spring 58 will again elevate the gate 59 to keep the bottles of the succeeding row that are being collected in alinement upon the belt 2.

When the gate has been lowered the wedging pushers 61, 62, 63, 64 and 65 are moved to the left (Fig. 8) to enter between the bottles of the row that is to be pushed upon the conveyer belt 40. The first bottle of the row engages the stop 66 and the succeeding bottles of the row are successively in contact. The apex of the first wedging pusher 61 is more than the diameter of a bottle away from the stop 66 and the apices of each two adjacent wedging pushers are separated more than the diameter of a bottle. When the wedging pushers are moved against the bottles the bottles are separated by spaces that slightly exceed the width of the partitions 67 in the box 68 so that such partitions may enter between the bottles. The bottles are pushed by the pushers 61, etc., against the pins 69 upon the conveyer belt 40. By means later to be described, after the row of bottles has been placed upon the conveyer belt such belt is advanced one step in position to have another portion thereof in position to receive a succeeding row of bottles which are positioned against other pins 69. These pins 69 serve to position the bottles with spaces therebetween to receive the partitions 70 in the box 68. The parallel partitions 67 are at right angles to the parallel partitions 70 and form therewith rows of bottle receiving spaces A, B, C, D, E and F.

The aforesaid wedging pushers are hinged upon an angular carrier bar 71, springs 72 holding the apices of the wedging pushers in proper initial position with respect to the bottles and permitting the wedging pushers to turn upon their hinges as they operate upon the bottles. The carrier bar 71 is carried upon a shaft 73 that is journaled at its ends in the horizontally moving sliding blocks or crossheads 74 that have sliding tongue and groove connections with the runways 75 provided in the upper side frame members 60. The runways 75, being parallel to the direction in which a row of bottles 74 are to be bodily moved from the belt 2 upon the belt 40, guide the wedging pushers in such direction in order that they may perform their function. The crossheads 74 are connected by a yoke 76 to whose middle portion a link 77 is connected. This link is connected at 78 with another link 79 that is operated by the cam 55 through the intermediation of mechanism intervening between this cam and link that will now be described.

The cam 55 is connected by means of a pitman 80 with a sliding block or crosshead 81 that moves in the slideway 82. The block 81 carries a pin 83 that is received in the slot formed in the arm 84. The arm 84 is fixed upon the lower end of a shaft 85 that is rigidly connected at its upper end with the aforesaid link 79. The cam 55, through the intermediation of the pitman 80, effects a crank movement that causes the reciprocation of the block or crosshead 81 to cause the to and fro movement of the yoke 76 and the crossheads 74 with the results that have been described. An arm 86 is anchored at one end to the yoke 76. A member 87 of an overrunning clutch is journaled upon the other end of the arm 86. A toothed ring 88, constituting another member of said overrunning clutch, surrounds and is carried by the member 87 and is adapted to turn with respect thereto or is adapted to turn therewith according to the direction of rotation of said ring. Clutch rollers 89 are interposed between the members 87 and 88 that cause these two members to turn together when the member 88 turns counterclockwise but when the member 88 turns clockwise it is adapted to turn upon and with respect to the member 87. The member 88 is in mesh with the rack 90 extending parallel to the direction in which the bottles are movable from the belt 2 upon the belt 40. When the wedging pushers are moving the bottles from the belt 2 upon the belt 40 the toothed ring 88 is turned in a clockwise direction because of its engagement with the rack 90, at which time said member 88 turns upon and with respect to the member 87. When the wedging pushers are being withdrawn the member 88 is turned in a counter clockwise direction to cause the member 87 to turn therewith. The member 87 is also in the nature of a crank, being connected by means of a pitman 91 with an arm 92 rigidly secured to the shaft 73 to which the carrier bar 71 is also rigidly secured. By means of the crank action effected by the clutch member 87 upon the withdrawing movement of the wedging pushers the carrier bar 71 is turned so as to be above the tops of the bottles of the next row that is being collected upon the belt 2 whereby the wedging pushers clear the bottles of such succeeding row when the wedging pushers are being restored to normal position. After the wedging pushers have cleared the bottles they are lowered into their initial position in readiness to remove the succeeding row of bottles from the belt 2 in a manner which has been described.

Some boxes that are to be filled with bottles may have insetting handles such as those indicated at 93, Fig. 29. These handles would interfere with the automatic deposit of the rows of bottles into the box when boxes having such handles are to be filled. By mechanism later to be described, the four bottle spaces at these two handles have to be supplied with bottles by hand. The first two rows of bottles which are to fill the rows of spaces A, B in the box (Fig. 29) contain, each, six bottles, assuming that the box is to contain thirty-six bottles. Each of the third and fourth rows of bottles is minus a bottle at each end and, therefore, contains but four bottles. The third and fourth rows of bottles are to be deposited in the rows of spaces C, D in the box. Each of the fifth and sixth rows of bottles is to have the full quota of six bottles, these last two rows of bottles being received in the rows of spaces E, F in the box.

A bevel gear 94 (Fig. 11) is fixed upon the shaft 46 and is in mesh with a bevel pinion 95 fixed upon the lower end of an upright shaft 96. The rollers 97 that drive the left hand belts 28 (Fig. 22) are fixed upon the upper portion of the shaft 96. A spur gear 98 is also fixed upon the shaft 96, this spur gear being employed in operating the mechanism that removes bottles from the belt 2 that are not to be placed upon the belt 40 but as this spur gear also actuates the operating gearing of other mechanism hitherto described the relation of this spur gear to such other gearing will first be set forth. The spur gear 98 is in mesh with a spur gear 99 that is fixed upon a shaft 100 upon which the pulleys 101 (that drive the right hand belts 28 shown in Fig. 22) are fixed. The spur gear 99 is in mesh with a spur pinion 102 which in turn is in mesh with a spur gear 103 that is fixed upon the shaft 104 which carries the pulleys 105 that drive the belts 5. The spur gear 103 is in mesh with a spur gear 106 which, in turn, is in mesh with the pinion 107 fixed upon the lower end of the shaft 11 (Fig. 10) whereby this shaft is driven. The spur gear 103 is also in mesh with the spur pinion 108 that, in turn, is in mesh with a spur gear 109 fixed upon the shaft 110 that carries the pulleys 111 that drive the belts 3 and 4 upon the right of the belt 2. The spur gear 109 is in mesh with the spur gear 112 fixed upon the shaft 113 that carries the pulleys 114 that drive the belts 3, 4 upon the left of the belt 2. The spur gear 109 is also in mesh with the spur pinion 115 which, in turn, is in mesh with the spur pinion 116 fixed upon the shaft 117 to whose lower end the bevel pinion 118 (Figs. 3 and 22) is secured. This bevel pinion 118 is in mesh with a bevel pinion 119 fixed upon a shaft that carries a drum pulley 120 which drives the belt 2.

The spur gear 98 is in mesh with the pinion 121 which is fixed upon a shaft 122 (Figs. 11 and 22), the shaft 122 being employed in effecting the operation of the mechanism that removes those bottles from the belt 2 that are not to be placed upon the belt 40. A clutch member 123 is in splined connection with the shaft 122 and is engageable with the clutch member 124 for the purpose of setting mechanism into motion, which will later be described, for causing each of the third and fourth rows of bottles to contain two less bottles than the remaining rows that are to be supplied to each box. The star wheel 36 has four teeth projecting from its periphery. These teeth successively engage one end of a centrally pivoted lever 125 whose other end is in pin and groove connection with the clutch member 123 and when the lever 125 is thus engaged by one of these teeth the clutch member 123 is engaged with the clutch member 124 to turn the bevel pinion 126 that is in fixed relation to the clutch member 124. The bevel pinion 126 is in mesh with the bevel pinion 127 that is fixed upon the shaft of a sprocket gear wheel 128. This sprocket gear wheel drives a chain 129 which carries fingers 130. Each time the chain is operated some one of the fingers 130 engages a bottle and moves it to the right from the belt 2 onto the deck 131 and from this deck onto the conveyer belt 133 (Fig. 11) that in turn is driven by the shaft 46. The tooth 134 engages the clutch lever 125 to shift the first of the bottles entered upon the belt 2 in the collection of the third row of bottles onto the belt 133. The tooth 135 engages the clutch lever 125 to shift the last of the bottles entered upon the belt 2 in the collection of said third row of bottles. The tooth 136 engages the clutch lever 125 to shift the first of the bottles entered upon the belt 2 in the collection of the fourth row of bottles. The tooth 137 engages the clutch lever 125 to shift the last of the bottles entered upon the belt 2 in the collection of said fourth row of bottles. The bottles that are thus shifted from the belt 2 by the action of the teeth 134, 135, 136 and 137 are conveyed by the belt 133 to the platform 138 (Fig. 8), from which platform they are removed by the attendant and placed in the bottle receiving spaces in the box 68 (Fig. 29) that are adjacent the handles 93. In the formation of the third and fourth rows of bottles the stop 66 (Figs. 2, 8 and 27) is moved inwardly sufficiently to position the first bottle of each of these rows into register with the space between the second pair of pins 69. The mechanism for adjusting the stop includes an operating cam 139 for a thirty-six bottle box or a cam $139^1$ for a twenty-four bottle box, the cam 139 being particularly referred to herein. This cam is fixed upon the shaft 140 that carries the ratchet wheel 141. An arm 142 is loose upon the shaft 140 and carries an actuating pawl 143 for turning the ratchet wheel 141 step by step (there being a ratchet wheel $141^1$ employed in the adjustment of the machine to place twenty-four bottles in the box). The arm 142 is connected by means of a link 144 with a link 145 which, in turn, is connected with a pitman 146 that is in crank connection with the cam 55. A lever 147 is pivoted between its ends as indicated at 148. This arm carries the depending pin 149 that is maintained in engagement with the cam 139 by a spring 150, Fig. 2. One end of the spring 150 is connected with a stationary arm 151 that is carried by the bracket 152. The other end of this spring is connected with the longer arm of the bell crank 153. The shorter arm of this bell crank and the shorter arm of the lever 147 are flexibly connected, preferably by means of a knife pivot $147^1$. The upper end of this long arm of the bell crank 153 is connected by a link 154 with one end of a rod 155 whose other end carries the pusher 66. The spring is effective in moving the stop 66 outwardly, the rise of the cam 139 being effective, against the force of the spring 150, to move the stop 66 inwardly, said cam rise being of such degree that it causes said stop to move inwardly to a position in which this stop will position a bottle in line with the second pair of pins 69, Fig. 8. The peripheral length of the rise of the cam 139 is sufficient to maintain the stop 66 in its inner position during the successive collections of the third and fourth rows of bottles upon the belt 2.

A narrow belt or support 156 is interposed between the belt 2 and the belt 40, the upper stretches of these two belts being substantially in the same plane. The belt 156 is caused to travel oppositely to the belt 2 by means of the crossed belt 157 (Fig. 2) which is suitably operated by gearing intervening between it and the motor 18. When the gate 59 is dropped the wedging pushers 61, etc., move the bottles from the belt 2 upon the belt 156, this latter belt, moving oppositely to the belt 2, coöperating with the wedging pushers in spacing the bottles apart as they are being moved toward the belt 40. In the transit of the bottles from the belt 156 to the belt 40 they are supported upon the stationary deck 158 which is upon the same level with the upper horizontal stretch of the belt 40. The belt 40 is formed of widened links, one of which is shown in Fig. 21. Adjacent each longitudinal edge of each link is a V-groove 40¹ parallel to such edge. These V-grooves receive the correspondingly shaped annular ridges 40² (Fig. 2) upon the sprocket wheels 40³ whereby the belt 40, as a whole, and the pins 69 thereupon are properly positioned with respect to the bottles being advanced to position upon the belt 40. The two sprocket wheels 40³ that are adjacent the deck or support 158 are fixed upon a shaft 159 (Fig. 5) that carries a ratchet wheel 160, Figs. 5 and 27. The ratchet wheel 160 and the shaft 159 upon which it is mounted are arranged to be actuated by a pawl 161 carried upon the arm 162 which is loosely supported upon said shaft. The arm 162 is connected with the pitman 146 so as to be given a complete oscillation upon each revolution of the cam 55. During each oscillation of the arm 162 the ratchet wheel 160 is turned the space of one tooth by the pawl 161 and as there are six teeth upon the wheel 160 the sprocket wheels 40³ are turned one-sixth of a revolution each time the ratchet-wheel is turned a step. The dimension of each link of the belt 40 measured in the direction of travel of the belt is equal to the length of each of the six faces of each sprocket wheel 40³, each link being sufficient to support a row of bottles properly spaced from adjacent rows of bottles upon the belt 40. After each row of bottles is placed upon the belt 40 the sprocket wheels are given one-sixth of a turn each to advance the link of the belt 40 that has just received a row of bottles and to place a succeeding link in position to receive a succeeding row of bottles. After six rows of bottles have been placed upon the belt 40 (assuming that a box having six rows is to be filled with bottles) the bottles are picked up from the belt and transferred to the box by mechanism to be described. It is desirable to make the pins 69 flush with the outer faces of the belt 40 after a set of bottles has been removed from the belt and when the pins are upon the inner side of the belt. To this end I employ expansion springs 163 (Fig. 19) that are interposed between the links of the belt 40 and projections 164 carried by said pins. When these springs are unrestrained they serve to withdraw the pins until the heads thereof are bottomed in the larger parts of the pin receiving openings in the belt 40, the extent to which the pins 69 are withdrawn being indicated by the dotted lines at the lower ends of these pins in Fig. 19. In order that the pins may be projected beyond the belt when they are to function I provide a cam plate 165 having a sloping end 165¹ (Fig. 1) facing the direction of travel of the bottles in their movement toward the belt 40. The pins ride upon the cam plate and are consequently projected outwardly against the force of the springs 163 while the bottles adjacent thereto are to be maintained in position thereby.

As the movements of the sprocket wheels 40³ are intermittent, I provide means whereby the sudden movements which they impart to the belt 40 do not disturb the engagement of the bottles with the pins 69. This means desirably resides in swinging arms 166 (Figs. 18 and 20). When these arms are not in service they are held within grooves 167, that extend lengthwise of the belt 40, by means of retractile coiled springs 168 which surround the pivot pins 169 upon which the arms 166 are rigidly secured and which pivot pins pass through and are adapted to turn with respect to the links of said belt. When the pins 169 encounter the cam plate 165 they are elevated sufficiently to clear the arms 166 from the grooves 167 whereupon the spring 168 will unwind to swing the arms to occupy positions transverse to the belt 40 to hold the bottles between them and the pins 69 in advance thereof. To limit the extent to which the arms may be swung by the unwinding action of the springs 168 I provide the pins 169 with lateral projections 170 that engage the pins 171 carried upon the inside of the belt 40. After the bottles have been removed the arms 166 encounter the pins 172 that first swing the arms into register with the grooves 167 and thereafter press these arms into said grooves. The arms are maintained in these grooves until the pins 169 again encounter the sloping end 165¹ of the cam plate 165. Just prior to the restoring adjustment of the arms 166 that has been effected by the pins 172, the pins 69 have left the cam plate 165 to permit the springs 163 to withdraw the pins 69.

The bottles collected upon the belt 40 preparatory to their deposit in the box are brought to position beneath bottle grippers 173, there being one gripper for each bottle. Each gripper, in the construction shown, includes three equidistant arms 174 provided with a suitable gripping element or jaw 175 made of felt, rubber, or other suitable material. Each arm 174 of a gripper is pivotally mounted upon a pivot pin 176 supported by carriers 177 fixed upon the lower end of a depending tubular extension 178 of a deck or plate or other mounting 179. The assembly of the tubes 178 with the decks 179 is desirably effected by the engagement of the deck 179 between the shoulders 180 that are provided upon the tubes 178 and the nuts 181 that are in threaded engagement with the upper ends of said tubes. Each bottle engaging clutch is operated by a cone 182 whose tapering face engages the arms 183 that are also provided upon the carriers 177 by the pins 176. Springs 184 connect intermediate portions of the arms 183 with the upper ends of the arms 174. The cones 182 of all bottle engaging grippers are simultaneously depressed when the bottles are to be gripped for the purpose of transfer to the box 68, these cones then operating to move the arms 183 outwardly to cause these arms to pull upon the springs 184 that thereby turn the arms 174 to press the jaws 175 into engagement with the bottles. The cones 182 are rigidly carried by the tubes 185 that depend from the deck or other mounting 186 which is assembled with all of the tubes 185 in a manner similar to the assembly of the tubes 178 with the deck 179. Because of the construction described, the deck 186 is lowered with respect to the deck 179 when the bottles collected upon the belt 40 are to be gripped. There is another deck 187, which is above the deck 186, and which is in fixed relation thereto, the function of this deck being hereinafter set forth. There is still another deck 188 that is located above the decks 179, 186, 187. Vertical racks or rods 189 pass through the topmost deck 188 and are clamped into engagement with the bottom deck 179 by means of the nuts 190 that are in threaded engagement with the rods 189 upon both sides of the lowermost deck 179. The rods 189, which are fixed with respect to the lowermost deck 179 by the nuts 190 as described, are engaged with the uppermost deck 188 whereby this deck 188 is adapted to support the lowermost deck 179. The means whereby the rack rods 189 are engaged with the topmost deck 188 desirably resides in the segmental gears 191 that are fixedly mounted upon a shaft 192 that turns within bearings 193 secured to the top side of the top deck 188. The function of the segmental gears 191 will hereinafter be set forth. The top deck 188, in turn, is supported upon the guide rods 194 that extend laterally of the belt 40 above and upon opposite sides of a platform 195 that is provided to support any box 68 which is to be loaded with bottles. The deck 186 is assembled with the deck 179 as illustrated in Figs. 1, 2, 3, 4, 6 and 30. Two vertical rods 196 are journaled at their lower ends to the lowermost deck 179, the rods being immovable vertically with respect to said deck. For reasons which will later appear, the deck 187 is made of fibrous material. As this deck 186 is to be brought into threaded engagement with the rods 196 I provide bushings 197 that are clamped to the deck 186 by clamping rings 198. The upper portions of the rod 196 are in splined connection with pinions 199 that are mounted upon the top deck 188 and have a plane of rotation fixed with respect to this deck, being mounted between the deck 188 and the plate 200 fixed upon the deck 188. By means of mechanism later to be described, the pinions 199 are simultaneously turned to turn the rods 196 in the bushings 197 whereby the deck 186 is lowered and elevated (according to the direction of rotation of the rods 196) to move the clutch cones 182 down or up simultaneously. The pinions 199 are engaged by a segmental gear 201 that is coaxial with and fixed with respect to a beveled pinion 202. This beveled pinion is in mesh with another beveled pinion 203 splined upon the shaft 204 which is parallel with the guide rods 194. An actuating arm 205 is fixed upon one end of the shaft 204 and is connected by means of a link 206 with one arm of a bell crank 207. The other arm of this bell crank carries a cam roller 208 (Fig. 6) which is actuated by a cam 209 fixed upon an intermittently rotated shaft 210.

Controlling mechanism, later to be set forth, sets the shaft 210 into rotation to effect the rotation of the shaft 204 to turn the segmental gear 201 to turn the pinions 199 and thereby effect the rotation of the rods 196 in the bushings 197 to move the deck 186 down and up. When the deck 186 is lowered and elevated by the operation of the segmental gear 201 the deck 179 does not have any accompanying vertical movement because of the construction illustrated most clearly in Fig. 15.

Each clutching cone 182 has a pin 211 fixed thereto and with respect to the tube 185 and vertically movable within opposite vertical slots 212 in the tube 178. Mechanism is provided for moving the lowermost deck 179 vertically and when such movement is imparted to this deck similar movement is imparted to the deck 186 because of the construction illustrated most clearly in Fig. 30, the rods 196 not being turned when the deck 179 is being moved down and up. The mechanism for moving the lowermost deck 179 down and up is inclusive of the segmental gears 191 hitherto mentioned as being fixed upon the shaft 192. An actuating arm 213 is fixed upon one end of the shaft 192 and is connected by means of a link 214 with one arm of a bell crank 215. The other arm of this bell crank carries a cam roller 216 (Fig. 3) which is actuated by a cam 217 fixed upon the intermittently rotated shaft 210. The same shaft 210 which, through the intermediation of the cams 209 and 217, effects the described operations of the decks 186 and 179, also effects the horizontal movement of the uppermost deck 188 upon the guide rods 194 (the remaining decks 179, 186 and 187 then also moving horizontally with the deck 188 with which they are coupled) to place the bottles that have been gripped by the grippers 173 over the bottle receiving spaces in the box 68 that is upon the platform 195. This horizontal movement of the deck 188 (and the other decks coupled therewith) occurs after the two decks 186, 179 have been simultaneously raised (to clear the bottles from the pins 69) due to the action of the cam 217 and the connection effected by the rods 196 between these decks. The means by which the horizontal movement of these decks is effected is inclusive of the shaft 210, hitherto mentioned, an arm 218 fixed upon this shaft and in pin or roller and slot connection with an arm 219 that is pivoted at its lower end to the frame of the matter. The upper end of this arm is in pin or roller and slot connection with the arm 220 that is pivoted where the arm 219 is pivoted. The upper end of the arm 220 is connected by means of a link 221 with one side of the topmost deck 188. Whenever the shaft 210 is turned the deck 188 and the other decks coupled therewith are moved over the platform 195 and are restored to initial position. Suitable cushions are provided to check the deck 188 in either extremity of its horizontal motion. These cushions may include cylinders 222 upon the frame of the machine and pistons 223 receivable in the cylinders. When the bottles are suspended above the box 68 upon the platform 195 the cam 217 operates to turn the segmental gears 191 in a direction to lower the deck 179 together with the decks 186 and 187 to place the bottles in the box 68, the topmost deck 188 remaining in a fixed plane that is defined by the rods 194. When the bottles are in the box, cam 209 comes into play to turn the rods 196 in a direction to raise the deck 186 to raise the clutching cones 182 to release the grippers 173 from holding engagement with the bottles whereby the bottles are allowed to remain in the box 68. After the bottles have been discharged from the grippers the platform 179 is raised by the cam 217 to elevate the grippers above the bottles whereafter the shaft 210 operated upon the link 221 through the mechanism that intervenes between this link and shaft to restore the decks to their initial positions above the belt 40. The four bottles which have been collected upon the platform 138 may now be placed by hand into the box 68 in the spaces underlying the handles 93.

The shaft 210, through the intermediation of the cams 209 and 217 and the arm 219 effects various operations that are performed in orderly sequence or relation and which are initiated after a full complement of bottles has been collected upon the belt 40. The means by which the shaft 210 is set into motion after a set of bottles has been collected upon the belt 40, includes a clutch member 224 (Figs. 1, 3, 24 and 25) which is splined upon the shaft 210. This clutch member is engageable with a complemental clutch member 225 which is loose upon the shaft 210 and is in fixed connection with the constantly running spur gear $46^2$, hitherto referred to as being driven by the motor 18. The clutch member 224 is in roller and slot connection with a clutch shifting lever 226 which is operated by the rod 227 connected by a link 228 with a shaft 229 (see also Fig. 27). An arm 230 is fixed upon shaft 229 that is connected by means of a link 231 with an intermediately pivoted lever 232. Lever 232 carries a pin 233 which is maintained in engagement with a cam 234. The cam 234 is driven by the crank action of the cam 55 operating through the pitman 146 and link 145 upon an arm 236 loosely journaled upon the shaft of the cam 234. This arm 236 carries an actuating pawl 237 that turns the six toothed ratchet wheel 238 one-sixth of a turn for each revolution of the cam 55. The cam 234 and the ratchet wheel 238 are employed when thirty-six bottles are to be placed in a box but when twenty-four bottles are to be placed in a box these elements are shifted out of position and are respectively replaced by the cam $234^1$ and ratchet wheel $238^1$. When the cam 234 has been moved the sixth step which occurs when the sixth row of bottles has been collected upon the belt 40, the rise of the cam engages the pin 233 to move the clutch lever 226 to the right (Fig. 25) to engage the clutch member 224 with the clutch member 225. The engagement between the clutch members 224 and 225 is maintained by the engagement of the latch 239 that is carried by the lever 226 with the upwardly spring pressed catch 240 (Fig. 25). During the engagement of the clutch members 224 and 225 the various operations, hitherto described, which the shaft 210 is to perform are effected whereafter the cam 241, in fixed relation to the clutch member 225, engages the tail of the catch 240 to disengage it from the latch 239 whereupon the spring 235 withdraws the clutch member 236 to the left to separate the clutch member 224 from the clutch member 225.

The platform 195 is large enough to support a box for containing thirty-six bottles and is associated with the box engaging centering jaws 242 carried by bars 243 that are adapted to be reciprocated at right angles to the sides of the platform where they are disposed. These rods 243 are connected by links 244 with a crank disk 245 which may be turned by a centering lever 246 to bring the centering jaws 242 into centering engagement with the box that is upon the platform 195. If boxes that contain, each, twenty-four bottles are to be successively placed upon the platform the jaws 242 at the right and left of the platform (Fig. 1) are inwardly extended or built up. It sometimes happens that obstructions are present in the box that prevent the deposit of the bottles therein. These obstructions may be in the nature of broken bottles in previously used boxes or some malformation in the construction of the boxes. When any of the bottles that are being deposited in the box encounter an obstruction the machine should be stopped, on which account I employ a deck 187 and parts coöperating therewith for closing the circuit of magnet 16 to open the circuit of the motor 18, and apply the brake mechanism as hitherto described. The deck 187 which is desirably of insulating material, carries thirty-six contacts 247 that are in parallel relation and connected with one terminal of the generator 17. These contacts are faced by other contacts 248 that are in parallel relation and are connected with the other terminal of the generator 17 through the winding of the magnet 16. When any contact 248 is brought into engagement with its complement 247 the circuit of the magnet 16 is closed with the results hitherto described.

Each tube 184 has a rod 249 in its bore. A contact 248 overlies the upper end of each rod 249, these contacts being movable vertically in the metallic brackets 250 through which they pass. Springs 251 are interposed between the brackets and pins 252 that are provided upon the lower ends of the contacts 248 whereby the pins 252 carried by the upper ends of the contacts 248 are normally engaged with the brackets to define the idle circuit opening positions of these contacts. The lower end of each rod 249 carries a head 253, which, normally, is not engaged in any of the operations. However, if the descent of any bottle is checked by an obstruction, this bottle will engage the head 253 overlying it to hold the rod 249 from descending while the decks are still descending whereby the contact 248 above such rod 249 is brought into engagement with its complemental contact 247 to establish the circuit of the magnet 16 and thereby stop the machine.

By reference to Fig. 15 it will be noticed that the rod 249 has a slot 254 through which the pin 211 passes and which slot permits movement of the rod 249 with respect to the tube 185 under the circumstances mentioned.

Referring particularly to Figs. 1, 2 and 4, one terminal of the generator 17 is connected with the long stationary horizontal rods 255 and 256. These rods are respectively received by and are co-extensive with the horizontal tubes 257, 258 that are mounted upon and travel with the deck 188. These tubes 257, 258 are in electrical connection respectively with the vertical tubes 259, 260 that are fixed upon the deck 188. Rods 261, 262 are received within the bores of the tubes 259 and 260 to have electrical engagement therewith. These rods are coupled with the deck 187 to move vertically therewith. By the connection described the circuit connections of the generator 17 with the contacts 247, 248 is maintained throughout all of the positions of the deck 187.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. Conveying mechanism including a horizontal belt for supporting articles to be conveyed; two symmetrically arranged belts arranged close to the aforesaid belt and whose inner stretches margin the longitudinal edges of the aforesaid belt; and two more symmetrically arranged belts located above the other symmetrically arranged belts and substantially parallel thereto.

2. Conveying mechanism including a horizontal belt for supporting articles to be conveyed; a second belt arranged close to the aforesaid belt and whose inner stretch margins the longitudinal edge of the aforesaid belt; and another belt located above the second belt and substantially parallel thereto.

3. Conveying mechanism including a belt for supporting articles to be conveyed; and mechanism for effecting the travel of said belt, in combination with means for checking the travel of the belt and operably engaged by articles when abnormally positioned upon said belt.

4. Conveying mechanism including a belt for supporting articles to be conveyed; and mechanism for effecting the travel of said belt, in combination with mechanism for checking the travel of the belt and including an operating lever projecting into the path of articles abnormally positioned upon said belt to be operated thereby.

5. Conveying mechanism including a belt for supporting articles to be conveyed; and mechanism for effecting the travel of said belt, in combination with mechanism for checking the travel of the belt and including an operating lever located at one side of said belt and projecting into the path of articles abnormally positioned upon said belt to be operated thereby; and belt mechanism opposite said lever and at the other side of the article supporting belt to prevent the lever from materially shifting the conveyed articles laterally of the supporting belt.

6. Conveying mechanism including a belt for supporting articles to be conveyed; and mechanism for effecting the travel of said belt, in combination with mechanism for checking the travel of the belt and including an operating lever located at one side of said belt and projecting into the path of articles abnormally positioned upon said belt to be operated thereby; and two belts, one above the other, at the other side of the article supporting belt to prevent the lever from materially shifting the conveyed articles laterally of the supporting belt.

7. Conveying mechanism including a belt for supporting articles to be conveyed; mechanism for driving the belt; and an electric motor for driving said mechanism, in combination with switching mechanism for checking the motor and having an operating element projecting into the path of articles abnormally positioned upon said belt to be operably engageable by such articles.

8. Conveying mechanism including a belt for supporting articles to be conveyed; mechanism for driving the belt; and an electric motor for driving said mechanism, in combination with switching mechanism for checking the motor and having an operating element at one side of the belt and projecting into the path of articles abnormally positioned upon the belt to be operably engageable by such articles; and belt mechanism opposite said switch operating element and at the other side of the article supporting belt to prevent the switch operating element from materially shifting the conveyed articles laterally of the supporting belt.

9. Conveying mechanism including a belt for supporting articles to be conveyed; mechanism for driving the belt; and an electric motor for driving said mechanism, in combination with switching mechanism for checking the motor and having an operating element at one side of the belt and projecting into the path of articles abnormally positioned upon the belt to be operably engageable by such articles; and two belts, one above the other, at the other side of the article supporting belt to prevent the switch operating element from materially shifting the conveyed articles laterally of the supporting belt.

10. Conveying mechanism including a belt for supporting articles to be conveyed; and mechanism for effecting the travel of said belt, in combination with means for checking the travel of the belt and operably engaged by articles when abnormally positioned upon said belt; and braking mechanism operated by said means.

11. Conveying mechanism including a belt for supporting articles to be conveyed; and mechanism for effecting the travel of said belt, in combination with mechanism for checking the travel of the belt and including an operating lever projecting into the path of articles abnormally positioned upon said belt to be operated thereby; and braking mechanism operated by said lever.

12. Conveying mechanism including a belt for supporting articles to be conveyed; and mechanism for effecting the travel of said belt, in combination with mechanism for checking the travel of the belt, and including an operating lever located at one side of said belt and projecting into the path of articles abnormally positioned upon said belt to be operated thereby; belt mechanism opposite said lever and at the other side of the article supporting belt to prevent the lever from materially shifting the conveyed articles laterally of the supporting belt; and braking mechanism operated by said lever.

13. Conveying mechanism including a belt for supporting articles to be conveyed; mechanism for driving the belt; and an electric motor for driving said mechanism, in combination with switching mechanism for checking the motor and having an operating element projecting into the path of articles abnormally positioned upon said belt to be operably engageable by such articles; and electro-magnetically controlled braking mechanism operated by said switching mechanism.

14. Conveying mechanism including a belt for supporting articles to be conveyed; mechanism for driving the belt; and an electric motor for driving said mechanism, in combination with switching mechanism for checking the motor and having an operating element at one side of the belt and projecting into the path of articles abnormally positioned upon the belt to be operably engageable by such articles; belt mechanism opposite said switch operating element and at the other side of the article supporting belt to prevent the switch operating element from materially shifting the conveyed articles laterally of the supporting belt; and electro-magnetically controlled braking mechanism operated by said switching mechanism.

15. Conveying mechanism including a belt for supporting articles to be conveyed; mechanism for driving the belt; and an electric motor for driving said mechanism, in combination with switching mechanism for checking the motor and having an operating element at one side of the belt and projecting into the path of articles abnormally positioned upon the belt to be operably engageable by such articles; two belts, one above the other, at the other side of the article supporting belt to prevent the switch operating element from materially shifting the conveyed articles laterally of the supporting belt; and electro-magnetically controlled braking mechanism operated by said switching mechanism.

16. A support for receiving a row of articles, in combination with a plurality of relatively movable wedging pushers for spreading said articles apart and moving them from said support.

17. A support for receiving a row of articles, in combination with a plurality of relatively movable wedging pushers for spreading said articles apart and moving them laterally from said support; and a conveyer angularly related to said support and onto which said pushers push said articles.

18. A support for receiving a row of articles, in combination with a plurality of relatively movable wedging pushers for spreading said articles apart and moving them laterally from said support, a conveyer angularly related to said support and onto which said pushers push said articles; and means for moving said conveyer step by step following the deposit of rows of articles thereupon.

19. A traveling belt for receiving a row of articles, in combination with a plurality of relatively movable wedging pushers for spreading said articles apart and moving them laterally from said traveling belt.

20. A traveling belt for receiving a row of articles, in combination with a plurality of relatively movable wedging pushers for spreading said articles apart and moving them laterally from said traveling belt; and a conveyer angularly related to said traveling belt and onto which said pushers push said articles.

21. A traveling belt for receiving a row of articles, in combination with a plurality of relatively movable wedging pushers for spreading said articles apart and moving them laterally from said traveling belt; a conveyer angularly related to said traveling belt and onto which said pushers push said articles; and means for moving said conveyer step by step following the deposit of rows of articles thereupon.

22. A support for receiving a row of articles, in combination with a plurality of relatively movable wedging pushers for spreading said articles apart and moving them laterally from said support; and counting mechanism for counting the articles disposed upon said support and controlling the operation of said wedging pushers.

23. A support for receiving a row of articles, in combination with a plurality of relatively movable wedging pushers for spreading said articles apart and moving them laterally from said support; counting mechanism for counting the articles disposed upon said support and controlling the operation of said wedging pushers; and a conveyer angularly related to said support and onto which said pushers push said articles.

24. A support for receiving a row of articles, in combination with a plurality of relatively movable wedging pushers for spreading said articles apart and moving them laterally from said support; counting mechanism for counting the articles disposed upon said support and controlling the operation of said wedging pushers; a conveyer angularly related to said support and onto which said pushers push said articles; and means for moving said conveyer step by step following the deposit of rows of articles thereupon.

25. A traveling belt for receiving a row of articles, in combination with a plurality of relatively movable wedging pushers for spreading said articles apart and moving them laterally from said traveling belt; and counting mechanism for counting the articles disposed upon said traveling belt and controlling the operation of said wedging pushers.

26. A traveling belt for receiving a row of articles, in combination with a plurality of relatively movable wedging pushers for spreading said articles apart and moving them laterally from said traveling belt; counting mechanism for counting the articles disposed upon said traveling belt and controlling the operation of said wedging pushers; and a conveyer angularly related to said traveling belt and onto which said pushers push said articles.

27. A traveling belt for receiving a row of articles, in combination with a plurality of relatively movable wedging pushers for spreading said articles apart and moving them laterally from said traveling belt; counting mechanism for counting the articles disposed upon said traveling belt and controlling the operation of said wedging pushers; a conveyer angularly related to said traveling belt and onto which said pushers push said articles; and means for moving said conveyer step by step following the deposit of rows of articles thereupon.

28. A support for receiving a row of articles, in combination with a plurality of pushers for spreading said articles apart and moving them laterally from said support; and counting mechanism for counting the articles disposed upon said support and controlling the operation of said pushers.

29. A support for receiving a row of articles, in combination with a plurality of pushers for spreading said articles apart and moving them laterally from said support; counting mechanism for counting the articles disposed upon said support and controlling the operation of said pushers; and a conveyer angularly related to said support and onto which said pushers push said articles.

30. A support for receiving a row of articles, in combination with a plurality of pushers for spreading said articles apart and moving them laterally from said support; counting mechanism for counting the articles disposed upon said support and controlling the operation of said pushers; a conveyer angularly related to said support and onto which said pushers push said articles; and means for moving said conveyer step by step following the deposit of rows of articles thereupon.

31. A traveling belt for receiving a row of articles, in combination with a plurality of pushers for spreading said articles apart and moving them laterally from said traveling belt; and counting mechanism for counting the articles disposed upon said traveling belt and controlling the operation of said pushers.

32. A traveling belt for receiving a row of articles, in combination with a plurality of pushers for spreading said articles apart and moving them laterally from said traveling belt; counting mechanism for counting the articles disposed upon said traveling belt and controlling the operation of said pushers; and a conveyer angularly related to said traveling belt and onto which said pushers push said articles.

33. A traveling belt for receiving a row of articles, in combination with a plurality of pushers for spreading said articles apart and moving them laterally from said traveling belt; counting mechanism for counting the articles disposed upon said traveling belt and controlling the operation of said pushers; a conveyer angularly related to said traveling belt and onto which said pushers push said articles and means for moving said conveyer step by step following the deposit of rows of articles thereupon.

34. Conveying mechanism including two angularly related conveyers, in combination with means for counting articles placed upon one conveyer; and means governed by the counting means for pushing a group of articles onto the other conveyer from and laterally of the conveyer on which said articles are initially collected.

35. Conveying mechanism including two angularly related conveyers, in combination with means for counting articles placed upon one conveyer; means governed by the counting means for pushing a group of articles onto the other conveyer from and laterally of the conveyer on which said articles are initially collected; and mechanism for moving the conveyer that ultimately receives the articles step by step to enable this conveyer to receive a number of groups of articles.

36. Conveying mechanism including two angularly related conveyers, in combination with means for counting articles placed upon one conveyer; means governed by the counting means for pushing a group of articles onto the other conveyer from and laterally of the conveyer on which said articles are initially collected; and mechanism governed by the counting mechanism for moving the conveyer that ultimately receives the articles step by step to enable this conveyer to receive a number of groups of articles.

37. Conveying mechanism including two angularly related conveyers, in combination with means for counting articles placed upon one conveyer; means governed by the counting means for pushing a group of articles onto the other conveyer from and laterally of the conveyer on which said articles are initially collected; mechanism for moving the conveyer that ultimately receives the articles step by step to enable this conveyer to receive a number of groups of articles; and means for diverting articles in some of the groups from passage to the latter conveyer.

38. Conveying mechanism including two angularly related conveyers, in combination with means for counting articles placed upon one conveyer; means governed by the articles placed upon one conveyer; means governed by the counting means for pushing a group of articles onto the other conveyer from and laterally of the conveyer on which said articles are initially collected; mechanism governed by the counting mechanism for moving the conveyer that ultimately receives the articles step by step to enable this conveyer to receive a number of groups of articles; and means for diverting articles in some of the groups from passage to the latter conveyer.

39. Conveying mechanism including a traveling support for articles that are to be conveyed; a gate located along one side of this support; mechanism for projecting this gate above the level of said support and for withdrawing it from position above said support and for a plurality of relatively movable wedging pushers for separating the articles and pushing them from the support laterally thereof upon withdrawal of the gate.

40. Conveying mechanism including two angularly related traveling supports; mechanism for pushing articles collected upon one support onto the other support; a stop adjustable along the first support for determining the length of the row of articles thereupon that is to be transferred to the second support; and mechanism for automatically adjusting the position of this stop.

41. Conveying mechanism including a belt; article positioning pins for positioning articles upon the belt; springs for withdrawing said pins; and a cam plate for projecting the pins against the force of said springs.

42. Conveying mechanism including a belt; article positioning pins for positioning articles upon the belt; means for projecting and withdrawing said pins; arms; and means for positioning said arms against articles that are positioned by said pins.

43. Conveying mechanism including a belt; article positioning pins for positioning articles upon the belt; springs for withdrawing said pins; a cam plate for projecting the pins against the force of said springs; arms; and means for positioning said arms against articles that are positioned by said pins.

44. Conveying mechanism including a belt; article positioning pins for positioning articles upon the belt; means for projecting and withdrawing said pins; arms; means for positioning said arms against articles that are positioned by said pins; and means for swinging said arms into and out of position.

45. Conveying mechanism including a belt; article positioning pins for positioning articles upon the belt; springs for withdrawing said pins; a cam plate for projecting the pins against the force of said springs; arms; means for positioning said arms against articles that are positioned by said pins; and means for swinging said arms into and out of position.

46. Conveying mechanism including a belt; article positioning pins for positioning articles upon the belt; means for projecting and withdrawing said pins; arms; means for positioning said arms against articles that are positioned by said pins; means for swinging said arms into and out of position; and means for withdrawing said arms to positions in which they do not project materially above the article supporting face of the belt.

47. Conveying mechanism including a belt; article positioning pins for positioning articles upon the belt; springs for withdrawing said pins; a cam plate for projecting the pins against the force of said springs; arms; means for positioning said arms against articles that are positioned by said pins; means for swinging said arms into and out of position; and means for withdrawing said arms to positions in which they do not project materially above the article supporting face of the belt.

48. Conveying mechanism including a belt; article positioning pins for positioning articles upon the belt; arms; and means for positioning said arms against articles that are positioned by said pins.

49. Conveying mechanism including a belt; article positioning pins for positioning articles upon the belt; arms; means for positioning said arms against articles that are positioned by said pins; and means for swinging said arms into and out of position.

50. Conveying mechanism including a belt; article positioning pins for positioning articles upon the belt; arms; means for positioning said arms against articles that are positioned by said pins; means for swinging said arms into and out of position; and means for withdrawing said arms to positions in which they do not project materially above the article supporting face of the belt.

51. Conveying mechanism including article engaging clutches; a mounting carrying these clutches; clutch actuating devices; and a second mounting carrying said clutch actuating devices, said mountings being relatively movable toward and from each other to apply and release the clutches.

52. Conveying mechanism including article engaging clutches; a mounting carrying these clutches; clutch actuating devices; and a second mounting carrying said clutch actuating devices, said mountings being relatively movable toward and from each other to apply and release the clutches, in combination with means for simultaneously lifting said mountings and the articles grasped by said clutches.

53. Conveying mechanism including article engaging clutches; a mounting carrying the clutches; clutch actuating devices; a second mounting carrying said clutch actuating devices, said mountings being relatively movable toward and from each other to apply and release the clutches; and means for causing said mountings to travel to effect the transfer of the articles from one place to another.

54. Conveying mechanism including article engaging clutches; a mounting carrying these clutches; clutch actuating devices; and a second mounting carrying said clutch actuating devices, said mountings being relatively movable toward and from each other to apply and release the clutches, in combination with means for simultaneously lifting said mountings and the articles grasped by said clutches; and means for causing said mountings to travel to effect the transfer of the articles from one place to another.

55. Conveying mechanism including article engaging clutches; a mounting carrying these clutches; clutch actuating devices; and a second mounting carrying said clutch actuating devices, said mountings being relatively movable toward and from each other to apply and release the clutches in combination with a conveyer for conveying the articles beneath the clutches that are to be grasped by the clutches.

56. Conveying mechanism including article engaging clutches; a mounting carrying these clutches; clutch actuating devices; and a second mounting carrying said clutch actuating devices, said mountings being relatively movable toward and from each other to apply and release the clutches, in combination with means for simultaneously lifting said mountings and the articles grasped by said clutches; and a conveyer for conveying the articles beneath the clutches that are to be grasped by the clutches.

57. Conveying mechanism including article engaging clutches; a mounting carrying these clutches; clutch actuating devices; and a second mounting carrying said clutch actuating devices, said mountings being relatively movable toward and from each other to apply and release the clutches, in combination with a conveyer for conveying the articles beneath the clutches that are to be grasped by the clutches; and means for causing said mountings to travel to effect the transfer of the articles from said conveyer.

58. Conveying mechanism including article engaging clutches; a mounting carrying these clutches; clutch actuating devices; and a second mounting carrying said clutch actuating devices, said mountings being relatively movable toward and from each other to apply and release the clutches, in combination with means for simultaneously lifting said mountings and the articles grasped by said clutches; a conveyer for conveying the articles beneath the clutches that are to be grasped by the clutches; and means for causing said mountings to travel to effect the transfer of the articles from said conveyer.

59. Conveying mechanism including clutches for grasping articles that are to be conveyed; means for elevating said clutches and the articles grasped thereby; means for causing these clutches to travel; and means for lowering the clutches to place the articles in a receptacle, in combination with electro-magnetic mechanism for checking the operation of the conveying mechanism and operable by obstructions encountered by the articles being deposited.

60. Conveying mechanism including article engaging clutches; a mounting carrying these clutches; clutch actuating devices; a second mounting carrying said clutch actuating devices, said mountings being relatively movable toward and from each other to apply and release the clutches; means for causing said mountings to travel to effect the transfer of the articles from one place to another; and means for lowering the clutches to place the articles in a receptacle, in combination with electro-magnetic mechanism for checking the operation of the conveying mechanism and operable by obstructions encountered by the articles being deposited.

61. Conveying mechanism including article engaging clutches; a mounting carrying these clutches; clutch actuating devices; and a second mounting carrying said clutch actuating devices, said mountings being relatively movable toward and from each other to apply and release the clutches, in combination with means for simultaneously lifting said mountings and the articles grasped by said clutches; means for causing said mountings to travel to effect the transfer of the articles from one place to another; means for lowering the clutches to place the articles in a receptacle; and electro-magnetic mechanism for checking the operation of the conveying mechanism and operable by obstructions encountered by the articles being deposited.

62. Conveying mechanism including article engaging clutches; a mounting carrying these clutches; clutch actuating devices; and a second mounting carrying said clutch actuating devices, said mountings being relatively movable toward and from each other to apply and release the clutches, in combination with a conveyer for conveying the articles beneath the clutches that are to be grasped by the clutches; means for causing said mountings to travel to effect the travel of the articles from said conveyer; means for lowering the clutches to place the articles in a receptacle; and electro-magnetic mechanism for checking the operation of the conveying mechanism and operable by obstructions encountered by the articles being deposited.

63. Conveying mechanism including article engaging clutches; a mounting carrying these clutches; clutch actuating devices; and a second mounting carrying said clutch actuating devices, said mountings being relatively movable toward and from each other to apply and release the clutches, in combination with means for simultaneously lifting said mountings and the articles grasped by said clutches; a conveyer for conveying the articles beneath the clutches that are to be grasped by the clutches; means for causing said mountings to travel to effect the transfer of the articles from said conveyer; means for lowering the clutches to place the articles in a receptacle; and electro-magnetic mechanism for checking the operation of the conveying mechanism and operable by obstructions encountered by the articles being deposited.

64. Conveying mechanism including clutches for grasping articles that are to be conveyed; means for elevating said clutches and the articles grasped thereby; means for causing these clutches to travel; and means for lowering the clutches to place the articles in a receptacle, in combination with electro-magnetic mechanism for checking the operation of the conveying mechanism; and switches in operating relation to said electro-magnetic mechanism, each clutch having a switch individual thereto, said clutches being relatively movable to enable any article that encounters an obstruction to move its clutch and effect the operation of the switch individual thereto to stop the operation of the conveying mechanism.

65. Conveying mechanism including article engaging clutches; a mounting carrying these clutches; clutch actuating devices; a second mounting carrying said clutch actuating devices, said mountings being relatively movable toward and from each other to apply and release the clutches; means for causing said mountings to travel to effect the transfer of the articles from one place to another; and means for lowering the clutches to place the articles in a receptacle, in combination with electro-magnetic mechanism for checking the operation of the conveying mechanism; and switches in operating relation to said electromagnetic mechanism, each clutch having a switch individual thereto, said clutches being relatively movable to enable any article that encounters an obstruction to move its clutch and effect the operation of the switch individual thereto to stop the operation of the conveying mechanism.

66. Conveying mechanism including article engaging clutches; a mounting carrying these clutches; clutch actuating devices; and a second mounting carrying said clutch actuating devices, said mountings being relatively movable toward and from each other to apply and release the clutches, in combination with means for simultaneously lifting said mountings and the articles grasped by said clutches; means for causing said mountings to travel to effect the transfer of the articles from one place to another; means for lowering the clutches to place the articles in a receptacle; electro-magnetic mechanism for checking the operation of the conveying mechanism; and switches in operating relation to said electro-magnetic mechanism, each clutch having a switch individual thereto, said clutches being relatively movable to enable any article that encounters an obstruction to move its clutch and effect the operation of the switch individual thereto to stop the operation of the conveying mechanism.

67. Conveying mechanism including article engaging clutches; a mounting carrying these clutches; clutch actuating devices; and a second mounting carrying said clutch actuating devices, said mountings being relatively movable toward and from each other to apply and release the clutches, in combination with a conveyer for conveying the articles beneath the clutches that are to be grasped by the clutches; means for causing said mountings to travel to effect the travel of the articles from said conveyer; means for lowering the clutches to place the articles in a receptacle; electro-magnetic mechanism for checking the operation of the conveying mechanism; and switches in operating relation to said electro-magnetic mechanism, each clutch having a switch individual thereto, said clutches being relatively movable to enable any article that encounters an obstruction to move its clutch and effect the operation of the switch individual thereto to stop the operation of the conveying mechanism.

68. Conveying mechanism including article engaging clutches; a mounting carrying these clutches; clutch actuating devices; and a second mounting carrying said clutch actuating devices, said mountings being relatively movable toward and from each other to apply and release the clutches, in combination with means for simultaneously lifting said mountings and the articles grasped by said clutches; a conveyer for conveying the articles beneath the clutches that are to be grasped by the clutches; means for causing said mountings to travel to effect the transfer of the articles from said conveyer; means for lowering the clutches to place the articles in a receptacle; electro-magnetic mechanism for checking the operation of the conveying mechanism; and switches in operating relation to said electro-magnetic mechanism, each clutch having a switch individual thereto, said clutches being relatively movable to enable any article that encounters an obstruction to move its clutch and effect the operation of the switch individual thereto to stop the operation of the conveying mechanism.

69. Conveying mechanism including a plurality of article holding clutches; means for lowering these clutches to deposit the articles carried thereby; electro-magnetic mechanism for stopping the conveying mechanism; and switches in operating relation to said electro-magnetic mechanism, each clutch having a switch individual thereto, said clutches being relatively movable to enable any article that encounters an obstruction to move its clutch and effect the operation of the switch individual thereto to stop the operation of the conveying mechanism.

70. A platform for supporting boxes; relatively movable jaws for gripping the boxes; and mechanism for adjusting the space between said jaws.

71. Conveying mechanism including clutches for grasping articles that are to be conveyed; means for elevating said clutches and the articles grasped thereby; means for causing these clutches to travel; and means for lowering the clutches to place the articles in a receptacle, in combination with mechanism for checking the operation of the conveying mechanism and operable by obstructions encountered by the articles being deposited.

72. The combination with a support; of a plurality of relatively movable wedging pushers for spreading apart articles that are on said support.

73. Conveying mechanism including two angularly related belts, in combination with means for pushing articles conveyed by one belt laterally of and from this belt onto the other belt.

74. Conveying mechanism including a conveyer; a belt for conveying articles to said conveyer and traveling angularly to said conveyer, in combination with means for pushing articles laterally of and from the belt onto the conveyer.

75. Conveyer mechanism including two angularly related conveyers, in combination with means for pushing articles from one conveyer onto the other; and means for moving the latter conveyer step by step following the deposit of articles thereupon.

76. Conveying mechanism including two angularly related belts, in combination with means for pushing articles conveyed by one belt laterally of and from this belt onto the other belt; and means for moving the latter belt step by step following the deposit of articles thereupon.

77. Conveying mechanism including a conveyer; a belt for conveying articles to said conveyer and traveling angularly to said conveyer, in combination with means for pushing articles laterally of and from the belt onto the conveyer; and means for moving the belt step by step following the deposite of articles thereupon.

78. Conveying mechanism including two angularly related belts, in combination with a plurality of relatively movable wedging pushers for spreading and pushing articles conveyed by one belt laterally of and from this belt onto the other belt.

79. Conveying mechanism including a conveyer; a belt for conveying articles to said conveyer and traveling angularly to said conveyer, in combination with a plurality of relatively movable wedging pushers for spreading and pushing articles laterally of and from the belt onto the conveyer.

80. Conveying mechanism including two angularly related conveyers, in combination with a plurality of relatively movable wedging pushers for spreading and pushing articles from one conveyer onto the other; and means for moving the latter conveyer step by step following the deposit of articles thereupon.

81. Conveying mechanism including two angularly related belts, in combination with a plurality of relatively movable wedging pushers for spreading and pushing articles conveyed by one belt laterally of and from this belt onto the other belt; and means for moving the latter belt step by step following the deposit of articles thereupon.

82. Conveying mechanism including a conveyer; a belt for conveying articles to said conveyer and traveling angularly to said conveyer, in combination with a plurality of relatively movable wedging pushers for spreading and pushing articles laterally of and from the belt onto the conveyer; and means for moving the belt step by step following the deposit of articles thereupon.

83. Conveying mechanism including a traveling support for articles that are to be conveyed; a gate located along one side of this support; mechanism for projecting this gate above the level of said support and for withdrawing it from position above said support; and means for pushing articles from the support laterally thereof upon withdrawal of the gate.

84. Conveying mechanism including two angularly related traveling supports; mechanism for pushing articles collected upon one support onto the other support; and a stop adjustable along the first support for determining the length of the row of articles thereupon that is to be transferred to the second support.

85. Conveying mechanism including a traveling support; mechanism for successively depositing rows of articles thereupon; and mechanism for moving said support step by step and operating consequent upon the deposit of all of a plurality of rows of articles thereupon to position the support to receive a succeeding row of articles.

86. Conveying mechanism including a traveling support; a support located alongside of said traveling support; another traveling support between the aforesaid supports; and means for moving articles from the first traveling support onto the second traveling support and thence onto the remaining support.

87. Conveying mechanism including a traveling support; a support located alongside of said traveling support; another traveling support between the aforesaid supports; and relatively movable wedging pushers for spreading said articles apart and moving them from the first traveling support onto the second traveling support and thence onto the remaining support.

88. Conveying mechanism including a belt; article positioning pins for positioning articles upon the belt; and means for projecting and withdrawing said pins.

In witness whereof I hereunto subscribe my name this fifth day of December, A. D. 1917.

JOSEPH FREUD.